US011087614B2

United States Patent
Kurani et al.

(10) Patent No.: US 11,087,614 B2
(45) Date of Patent: Aug. 10, 2021

(54) METHODS AND SYSTEMS OF SMART CAMPUS SECURITY SHIELD

(71) Applicants: Hemal B. Kurani, Sunnyvale, CA (US); Hetal B. Kurani, Sunnyvale, CA (US)

(72) Inventors: Hemal B. Kurani, Sunnyvale, CA (US); Hetal B. Kurani, Sunnyvale, CA (US)

( * ) Notice: Subject to any disclaimer, the term of this patent is extended or adjusted under 35 U.S.C. 154(b) by 0 days.

(21) Appl. No.: 16/687,472

(22) Filed: Nov. 18, 2019

(65) Prior Publication Data

US 2020/0160690 A1    May 21, 2020

Related U.S. Application Data

(60) Provisional application No. 62/770,185, filed on Nov. 21, 2018.

(51) Int. Cl.
| | |
|---|---|
| *G08B 25/01* | (2006.01) |
| *G06N 20/00* | (2019.01) |
| *G08B 25/12* | (2006.01) |
| *G08B 25/10* | (2006.01) |
| *G06K 19/077* | (2006.01) |
| *G06Q 50/26* | (2012.01) |

(52) U.S. Cl.
CPC ..... *G08B 25/016* (2013.01); *G06K 19/07709* (2013.01); *G06K 19/07713* (2013.01); *G06N 20/00* (2019.01); *G06Q 50/265* (2013.01); *G08B 25/10* (2013.01); *G08B 25/12* (2013.01)

(58) Field of Classification Search
None
See application file for complete search history.

(56) References Cited

U.S. PATENT DOCUMENTS

| | | | | |
|---|---|---|---|---|
| 5,590,038 | A * | 12/1996 | Pitroda | G06Q 20/3415 705/41 |
| 5,955,961 | A * | 9/1999 | Wallerstein | G06Q 20/3415 235/380 |
| 6,693,544 | B1 * | 2/2004 | Hebbecker | G06K 19/02 340/573.1 |
| H2120 | H * | 7/2005 | Cudlitz | 235/382 |
| 7,191,952 | B2 * | 3/2007 | Blossom | G06K 19/06187 235/380 |
| 8,604,929 | B1 * | 12/2013 | Yadav-Ranjan | G06Q 50/265 340/573.1 |
| 10,210,744 | B2 * | 2/2019 | Diallo | H01Q 1/2208 |

(Continued)

*Primary Examiner* — Chico A Foxx

(57) ABSTRACT

A Smart Campus Security Shield System comprising a Smart Student ID Card, wherein the card comprises a set of sensors inside the Smart Student ID Card. The set of sensors send a crime alert through a wireless network to a cloud server. The cloud server memory comprises a student crime alert model which describes the crime alert severity, student ID number, name, location, date, time, and a set of details of the student, so that the student risk control model can generate a plurality of corrective actions and preventive actions for each individual student. The crime alerts personalized and adaptive machine learning method presents a set of customized corrective actions and preventive actions to a student, based on at least one student attribute data. A set of student safety performance statistics is used to generate an optimal safety management strategy for the school security staff to reduce school crime.

19 Claims, 18 Drawing Sheets

(56) References Cited

U.S. PATENT DOCUMENTS

| | | | |
|---|---|---|---|
| 2009/0132673 A1* | 5/2009 | Sprigg | G08G 1/0104 |
| | | | 709/207 |
| 2009/0294524 A1* | 12/2009 | Rice | G06Q 20/342 |
| | | | 235/380 |
| 2011/0260859 A1* | 10/2011 | Maurer | H04N 7/188 |
| | | | 340/539.13 |
| 2014/0364081 A1* | 12/2014 | Rauner | G08B 25/016 |
| | | | 455/404.2 |
| 2018/0199179 A1* | 7/2018 | Rauner | G08B 25/10 |
| 2019/0274612 A1* | 9/2019 | Chavez, Jr. | G06Q 50/265 |
| 2019/0274613 A1* | 9/2019 | Chavez, Jr. | A61B 5/168 |
| 2020/0126174 A1* | 4/2020 | Halse | G06F 40/295 |
| 2020/0225313 A1* | 7/2020 | Coles | G08B 13/1672 |

\* cited by examiner

Smart Campus Security Shield System

Smart Student ID Card Front View
310

Smart Student ID Card Back View
320

Table 142 - Severity Ranking, Definition and Failure Effects Description

| Severity Ranking (SR) | Definition | Failure Effects Description | Crime Alert Type Examples |
|---|---|---|---|
| 5 | Catastrophic | A failure mode which could potentially result in student or school staff<br>• death<br>• life threatening injury<br>• reduction in life expectancy<br>• irreversible deterioration of the state of health | Active Shooter, Weapons Assault |
| 4 | Critical | A failure mode which could potentially result in student or school staff<br>• permanent impairment<br>• permanent damage to a body function/structure | Physical Fight, Carried a Weapon like gun, knife, club |
| 3 | Serious | A failure mode which could potentially result in student or school staff<br>• Injury requiring medical intervention to prevent serious harm<br>• reversible deterioration of the state of health<br>• emotional distress, social anxiety disorder | Bullying, Drug Use, Stalking, Dating Violence, Gang Violence |
| 2 | Minor | A failure mode which could potentially result in student or school staff<br>• physical injury or temporary impairment not requiring professional medical intervention | Profanity, Burglary, Suspicious Behavior |
| 1 | Negligible | A failure mode which could potentially result in student or school staff temporary discomfort | Disruptive, Cheating, Tease |

Table 144 - Probability of Occurrence Ranking, Definition and Description

| Occurrence Ranking (OR) | Definition | Description |
|---|---|---|
| 5 | Frequent | High probability of occurrence. Can occur frequently when the student or school staff is in the school |
| 4 | Probable | Can occur several times when the student or school staff is in the school |
| 3 | Occasional | Likely probability of occurrence at least once when the student or school staff is in the school |
| 2 | Remote | Unlikely probability of occurrence when the student or school staff is in the school |
| 1 | Improbable | Probability is not expected when the student or school staff is in the school |

FIGURE 14

Table 152 – Detection Ranking, Definition and Description

| Detection Ranking (DR) | Definition | Description |
|---|---|---|
| 5 | Remote | Difficult to detect - None / unknown - current school system, school staff or teacher may not detect the student behavioral issues |
| 4 | Low | Low likelihood – Low chance the current school system, school staff or teacher can detect the student behavioral issues. |
| 3 | Moderate | Moderate likelihood – Moderate chance the current school system, school staff or teacher can detect the student behavioral issues. |
| 2 | High | High likelihood – high chance the current school system, school staff or teacher can detect the student behavioral issues. |
| 1 | Very High | Very easy to detect the student behavioral issues by the current school system, school staff or teacher. |

Table 154 – Risk Priority Number (RPN), Hazard Risk and Description

| Risk Priority Number (RPN) | Hazard Risk Definition | Description |
|---|---|---|
| 45-125 | Intolerable (INT) | Risk in this category is not acceptable. Risk mitigation and risk control through CAPAs required. Situation results in school violence.<br><br>Example disciplinary action: Expulsion |
| 16-44 | As Far As Possible (AFAP) | Risk is reduced to As Far As Possible (AFAP) without there being room for economic considerations like cost and resources. Attempts should be made to reduce the risk through CAPAs to Broadly Acceptable Region. Situation can result in school violence.<br><br>Example disciplinary action: Suspension |
| 1-15 | Broadly Acceptable Region (BAR) | Risk is considered to be negligible compared to the risk of other hazards and in view of the benefit to the school. Situation might not result in school violence.<br><br>Example disciplinary action: Referrals, Disruptive behavior |

FIGURE 15

Table 162 – Student Discipline Ranking, Definition and Description

| Student Discipline Ranking (SDR) | Definition (Disciplinary Action) | Description |
|---|---|---|
| 5 | Expulsion | Expulsion is removal or banning of a student from a school system due to persistent violation of school policies or rules, or in extreme cases, for a single offense of marked severity.<br><br>For example, causing death or physical injury to another person and so on. |
| 4 | Suspension | A suspension is a temporary removal of a student from his or her regular educational setting for a violation of school policies or rules.<br><br>For example, physical fight resulting in injury, carrying gun or knife to school and so on. |
| 3 | Referrals | Referral can be a way for a teacher to refer a student to an administrator or school security staff to be disciplined.<br><br>For example, Bullying, drug use, alcohol and so on. |
| 2 | Disruptive Behavior | Disruptive behavior is when student is uncooperative and prevents themselves and other student's in class from working.<br><br>For example, Verbal or physical threats to students or faculty, grandstanding, teasing, yelling, aggression toward other students or teacher, sleeping in class, answering cell phones and so on. |
| 1 | Positive Behavior | Positive behavior is when student actions create a positive school learning environment and enabling others to work more effectively<br><br>For example, attentive, alert, calm, cheerful, well-groomed, engaging, stays on task, consistent, goal-directed, inquisitive, accepts mistakes, willing to try again, asks for help, cooperative, takes initiative, agreeing, making balanced criticisms, approving, showing affection, protecting, praising, understanding and forgiving, and so on. |

FIGURE 16

Table 172 - Exemplary corrective actions and preventive actions assigned by the personalized machine learning method

| Crime Alert Type | Safety Problem | Root Cause of the Problem | Corrective Actions and Preventive Actions |
|---|---|---|---|
| Active Shooter<br><br>Before CAPA's Implementation (SR=5, OR=3, DR=5, RPN=75, SDR=5) | 1. Student or school staff death<br>2. Student or school staff life threating injury | 1. Talking about guns and violence<br>2. Fascination with violent video games, TV shows, and movies<br>3. Isolation from family and friends | Corrective Action<br>1. Arrest and Expel student in case of active shooter<br>Preventive Actions<br>1. Have face-to-face meeting and find the root cause of why student is talking about the guns and violence<br>2. Enroll student in sports or other club activities to reduce the exposure to violent video programs<br>3. Connect student to caring adults and after-school programs |
| Physical Fight<br><br>Before CAPA's Implementation (SR=4, OR=4, DR=2, RPN=32, SDR=4) | 1. Student injured<br>2. Student in physical fight<br>3. Student was threatened with a gun or knife. | 1. Aggressive behavior and cruelty to pets and other animals<br>2. Poor grades given by the teacher | Corrective Action<br>1. Break the fight between students for non-injury cases<br>2. Arrest and Suspend student in case of injury<br>Preventive Actions<br>1. Monitor aggressive student behavior and channel it towards activities like sports<br>2. Indicate to parents the potential for growth in their child |
| Bullying<br><br>Before CAPA's Implementation (SR=3, OR=2, DR=3, RPN=18, SDR=3) | 1. Student was bullied in school<br>2. Student was cyberbullied<br>3. Student did not go to school because they felt unsafe at school or on their way to from school. | 1. Feeling powerless in their own lives<br>2. Someone else is bullying them<br>3. Bullies are often jealous of or frustrated with the person they are bullying<br>4. Lack of Understanding or Empathy<br>5. Looking for Attention<br>6. Bullies come from dysfunctional families<br>7. Bullies don't care how others feel<br>8. Bullies can't regulate their emotions | Corrective Actions<br>1. Have face-to-face meeting with student who bullied and find the root cause<br>2. Have face-to-face meeting with student who was bullied and find the root cause<br>3. Ensure bullied student is not alone during school hours<br>Preventive Actions<br>Teachers and school administrators<br>1. Set positive expectations about the behavior of student<br>Parents of the students that are bullying<br>2. Educate your child about bullying and its consequences<br>3. Model positive behavior at home<br>Parents of the students being bullied<br>4. Observe your child for signs<br>5. Teach your child how to handle being bullied. |

FIGURE 17

Table 182 – Exemplary preventive actions refined and updated by the adaptive machine learning method

| Corrective and Preventive Actions | Bayesian Predictive Learning Model | Structured Prediction Learning Model | Reinforcement Learning Model |
|---|---|---|---|
| Initial Preventive Action for Crime Alert Type Physical Fight<br><br>Monitor aggressive student behavior and channel it towards activities like sports | Preventive Actions refined and updated based on student personal interest attributes<br><br>1. Enroll student in the school soccer team as a player<br>2. Connect student with a parent who has interest in the soccer game<br>3. Spend more time watching soccer games | Preventive Actions refined and updated based on student preferred instructional format<br><br>1. Enroll student in the school soccer team as a goalkeeper<br>2. Connect student with a parent who is soccer coach<br>3. Spend more time watching soccer games in the school | 1. Participation certificate<br>2. Medals<br>3. Outstanding Athlete Award<br><br>After CAPA's Implementation (SR=4, OR=2, DR=2, RRPN=16, RSDR=2) |
| Initial Preventive Action for Crime Alert Type Bullying<br><br>Set positive expectations about the behavior of student | Preventive Actions updated based on student personal interest attributes<br><br>1. Help student understand bullying and its consequences through training<br>2. Connect student with a science teacher for advice on science fair projects<br>3. Student participates in science fair competitions | Preventive Actions updated based on student preferred instructional format<br><br>1. Enroll student in the school stop bullying training<br>2. Connect student with a science teacher for advice on physical science fair projects<br>3. Student participates in physical science fair competitions | 1. Participation certificate<br>2. Medals<br>3. Outstanding Science Student Award<br><br>After CAPA's Implementation (SR=3, OR=2, DR=2, RRPN=12, RSDR=1) |

FIGURE 18

METHODS AND SYSTEMS OF SMART CAMPUS SECURITY SHIELD

CLAIM OF PRIORITY

This application is a claims priority from provisional U.S. Application Provisional No. 62/770,185 filed 21 Nov. 2018. This application is hereby incorporated by reference in its entirety.

FIELD OF THE INVENTION

The present invention relates generally to a smart identification card that incorporates a mechanism for activating crime alerts as well as locks on doors and gates to secure areas of a building.

DESCRIPTION OF THE PRIOR ART

There are various security devices in the art known for their uses in school. They come in the form of school perimeter security system, smart cards with specific access privileges, and school security methods and systems.

U.S. Pat. No. 8,436,712 to Rafferty describes a smart card apparatus for facility access, security access, and privilege access. A distance limitation is also encoded into the card. When the card exceeds the distance limitation, the existing transponder is alarmed. The existing GPS transponder receives location information from the card so that card user can be recovered.

U.S. Pat. No. 9,489,825 to McDonnell et al. illustrates a computerized school safety system for providing information to an emergency responder about an alert at a school. The system includes a computerized process wherein programs are configured to monitor inputs from a mobile computerized device within the school. The inputs may include location data for the mobile computerized device combined with a floor plan for the school to provide a tactical display to the emergency responder comprising the combined inputs and floor plan.

U.S. Pat. No. 9,424,725 to Keohane et al. discloses a school perimeter security system which includes a database with registered student mobile device identifiers. It includes three beacon devices located within the school perimeter, positioned to establish a boundary area near the perimeter, and detect and establish communication with mobile devices entering the boundary area. It obtains an identifier from each mobile device that enters the boundary area and compares the identified mobile devices with identifiers in the registry database, transmitting an alert notice.

Unfortunately, such security system and methods do not address school safety problems, root cause analysis and identification, or implementation of corrective actions and preventive actions to reduce school crime. The computerized systems, methods and devices are reactive rather than proactive. Further, they address only a limited number of items, such as a surveillance video camera is used for monitoring crime. Panic based devices send the alerts to the system for help only. The school perimeter security system enables facility access and information about student entry and exit only. Computerized school safety systems focus on providing information to an emergency responder about an alert at a school. Thus, there is a need for a computerized security system with a smart student ID card which not only provides reactive crime alerts, but also proactively monitors students' behavior and discipline data to address them before crime can occur.

Many students feel unsafe during school due to shootings, physical fights and bullying. The estimated cost of youth violence is billions of dollars annually. To solve this problem, the present invention includes a Smart Student ID Card, enabling students to report crimes like these to school security staff and send real time alerts to emergency responders like police, medical responders, and fire fighters. A Smart Campus Security Shield is a hardware and software system to accumulate and monitor student disciplinary trends. The hardware comprises of a Smart Student ID Card and a Smart Campus Security Shield Cloud Server, and the software consists of a Smart Campus Security Shield Software with a database. The Smart Student ID Card sends real time crime alerts to the cloud server, providing an area map with live crime alerts, reports and feedback from the monitored Smart Student ID Cards, such as information regarding the crime alert severity, student ID number, name, location, date, time, and student details. The Smart Campus Security Shield Software conducts risk analysis of the crime alerts big data and assigns appropriate risk controls in the form of corrective actions and preventive actions for each individual student. The implementation of corrective actions and preventive actions helps in reducing school crime.

The Smart Campus Security Shield System solves the problem of school crime by collecting and sending crime alerts data through a wireless network, providing real time feedback to school security staff and emergency responders, thereby reducing crime. The Smart Student ID Card is used to auto record a student school entry and exit date and time. It creates a safe classroom and school learning environment for the student and staff. It helps in the overall development of each student and his or her spiritual, moral, intellectual, social, emotional and physical capabilities.

The Smart Campus Security Shield System instills positive behavior in the student through implementation of corrective actions and preventive actions. The positive behavior includes student attributes like attentive, alert, calm, cheerful, well-groomed, engaging, stays on task, consistent, goal-directed, inquisitive, accepts mistakes, willing to try again, asks for help, cooperative, takes initiative, agreeing, making balanced criticisms, approving, showing affection, protecting, praising, understanding and forgiving, and so on.

SUMMARY OF THE INVENTION

A Smart Campus Security Shield System comprising a Smart Student ID Card, wherein the card comprises a set of sensors inside the Smart Student ID Card. The set of sensors send a crime alert through a wireless network to a cloud server. The cloud server memory comprises a student crime alert model which describes the crime alert severity, student ID number, name, location, date, time, and a set of details of the student, so that the student risk control model can generate a plurality of corrective actions and preventive actions for each individual student. The crime alerts personalized and adaptive machine learning method presents a set of customized corrective actions and preventive actions to a student, based on at least one student attribute data. A set of student safety performance statistics is used to generate an optimal safety management strategy for the school security staff to reduce school crime.

Smart Student ID Card and Smart Campus Security Shield System can reduce money spent for school crime control measures and harm to students, teachers, pedestrians or a neighborhood. Continuous monitoring of student behavior trends allows for appropriate actions to prevent the crime before it occurs and school to save money. The invention promotes a safe, orderly, caring, positive relationship between the students, teachers and staff as well as a supportive school environment. It also helps in providing every student with a strong academic, behavioral, social, and emotional skills to prepare them for success in a diverse, challenging, and ever-changing world.

The goal of the Smart Campus Security Shield System is to target the right risk controls to the right students at the right time to reduce school crime.

BRIEF DESCRIPTION OF THE DRAWINGS

FIG. 14 illustrates an example severity and occurrence ranking, definition and description, according to some embodiments.

FIG. 15 illustrates an example detection ranking, definition, description, and Risk Priority Number, hazard risk definition, and description, according to some embodiments.

FIG. 16 illustrates an example student discipline ranking, definition and description, according to some embodiments.

FIG. 17 illustrates an exemplary corrective actions and preventive actions assigned by the personalized machine learning method, according to some embodiments.

FIG. 18 illustrates exemplary preventive actions refined and updated by the adaptive machine learning method, according to some embodiments.

Figure 1:
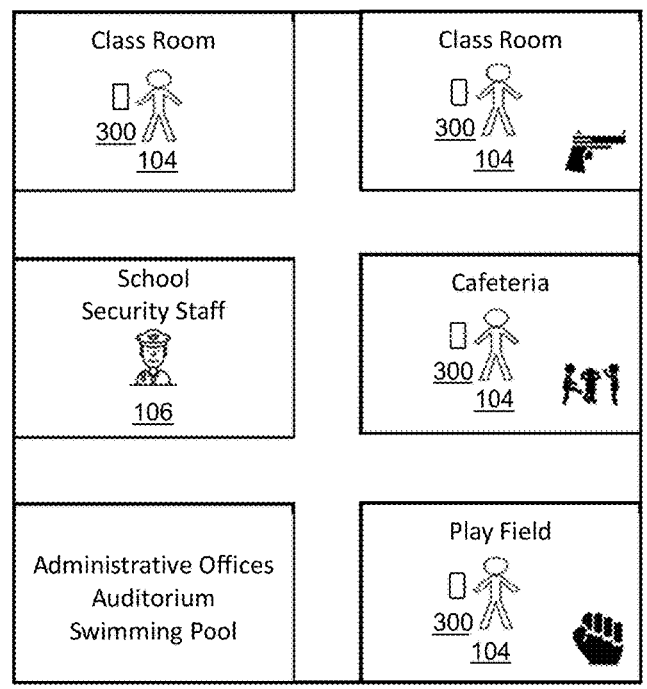
FIG. 1 illustrates an example Smart Campus Security Shield System to continuously monitor Smart Student ID Card crime alerts to reduce crime, according to some embodiments.

The Figures described above are a representative set and are not an exhaustive with respect to embodying the invention.

DESCRIPTION

The disclosed invention is a means of sending a crime alert to generate corrective actions and preventive actions to eliminate or reduce school crime. In one embodiment, the Smart Campus Security Shield System is a two-fold system with hardware and software components. The hardware includes a Smart Student ID Card with a microcomputer and sensors. The Smart Student ID Card sends crime alert data through a wireless network to the Smart Campus Security Shield Cloud Server comprising software. The software program includes different interactive user interfaces such as, inter alia: dashboard with school map, student crime alerts, student corrective actions and preventive actions, safety performance, emergency responders detail, safety plan, natural threat and external threat information and system administration functionality and so on.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, algorithm, method, user selections, network transactions, database queries, database structures, hardware modules, hardware circuits, hardware chips, machine learning techniques, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

Exemplary Definitions

Access Badge is a credential used to gain entry to an area having automated access control entry points. Entry points may be doors, turnstiles, parking gates or other barriers. The access badge and Smart Student ID Card words are used interchangeably.

Adaptive Learning Method can be an ability of a teacher or an automated machine learning method to change a student's corrective actions and preventive actions or general approach to encourage student discipline. In an online environment, it allows the teacher or the machine learning method to analyze the corrective actions and preventive actions of individual students on a continuous basis and make modifications for positive behavior outcomes.

Algorithm can be a process or set of rules to be followed in calculations or other problem-solving operations, especially by a computer.

Application Programming Interface (API) can specify how software components of various systems interact with each other. The API can be also used to create a mobile application to interact with Smart Campus Security Shield Software.

Bayesian predictive model uses Bayesian inference method of statistical inference in which Bayes' theorem is used to update the probability for a hypothesis as more evidence or information becomes available. For example, initial hypothesis of student corrective actions and preventive actions are refined and updated based on student personal attribute data. The more evidence in the form of student personal attribute data may be available or might become available as part of school security staff or teacher interaction with the student.

BLUETOOTH is a wireless technology standard for exchanging data over short distances (e.g. using short-wavelength UHF radio waves in the ISM band from 2.4 to 2.485 GHz from fixed and mobile devices, and building personal area networks (PANS), etc. It is noted that other communication systems that transmit signals with messages from user's device to recipients can be used as well.

Camera is a device for recording visual images in the form of photographs, film, or video signals.

Cloud Server can involve deploying groups of remote servers and/or software networks that allow centralized data storage and online access to computer software or resources. These groups of remote serves and/or software networks can be a collection of remote computing services.

Clustering is a machine learning technique that involves the grouping of data points. It usually involves the grouping of similar things or people positioned or occurring closely together.

Corrective Action is an action taken to eliminate the causes of an existing nonconformity or other undesirable situation. The corrective action should eliminate the recurrence of the issue.

Crime is an action or activity that constitutes danger, threat, or potentially dangerous or difficult circumstances.

Crime Alert can involve issuing a timely warning for any danger, threat, or potentially dangerous or difficult circumstances. It can be an event which is not part of the standard school operation or which may cause disruption to or a reduction in the quality of services and student productivity.

Emergency Responders are people who are specially trained to provide help in case of crime, medical emergencies or fire.

Harm is a physical injury or damage to the health of people, or damage to property or the environment.

Hazard can be a potential source of harm.

Machine Learning can be method of data analysis that automates analytical model building. Machine learning is a branch of artificial intelligence that uses statistical techniques to give computer systems the ability to learn from data, without being explicitly programmed. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Historical user data, set of other user data that are similar to the user, etc. can be used as training data sets.

Method can be a particular form of procedure for accomplishing something.

Model can be a system used as an example to follow.

Panic button can be a button for summoning help in an emergency like crime alert. Panic button is made of a touch-sensitive part and a push button.

Personalized Learning Method can be an innovative approach to tailoring risk controls including corrective actions and preventive actions that take differences in students' overall personal capabilities into account. It is based on student's overall attributes.

Preventive Action can an action taken to eliminate the causes of a potential nonconformity associated with crime, incident, or other undesirable situation in order to prevent occurrence. The preventive action should eliminate or prevent the occurrence of the potential issues.

Reinforcement Learning—A type of machine learning technique that enables an agent to learn without an intervention from a human in an interactive environment by trial and error using a system of student reward and penalty from its own actions and experiences. For e.g. Student reward can be in the form of participation certificate, medals, outstanding athlete award and so on.

Residual Risk can be risk remaining after risk control measures have been taken.

Risk can be a combination of the probability of occurrence of harm and the severity of that harm.

Risk Analysis can be a systematic use of available information to identify hazards and to estimate the risk.

Risk Assessment can be an overall process comprising a risk analysis and a risk evaluation.

Risk Control can be a process in which decisions are made and measures such as corrective actions and preventive actions are implemented by which risks are reduced to, or maintained within, specified levels.

Risk Estimation can be a process used to assign values to the probability of occurrence of harm and the severity of that harm.

Risk Evaluation can be a process of comparing the estimated risk against given risk criteria to determine the acceptability of the risk.

Risk Management can be a systematic application of administration policies, procedures, and practices to the tasks of analyzing, evaluating, controlling and monitoring risk.

Risk Mitigation can be an assignment of corrective actions and preventive actions to mitigate risk.

Root Cause Analysis can be the analysis necessary to determine the original or true cause of a crime, system, product or process nonconformity. This effort extends beyond the effects of a problem to discover its most fundamental cause.

Radio Frequency Identification (RFID) is a form of wireless communication that incorporates the use of electromagnetic fields in the radio frequency portion of the electromagnetic spectrum to uniquely identify an object.

Radio Frequency Identification Tag (RFID Tag) is an electronic tag or identification that exchanges data with a RFID reader through radio waves. A RFID Tag is also known as a RFID chip.

Radio Frequency Identification Reader (RFID reader) is a device used to gather information from an RFID Tag, which is used to track individual objects.

Risk Priority Number (RPN) can be the numeric assessment of risk assigned to a risk item, as part of Failure Modes and Effects Analysis. The RPN is calculated by multiplying severity ranking, occurrence ranking, and detection ranking. The emphasis on corrective actions and preventive actions is given to those with highest risk.

Residual Risk Priority Number (RRPN) can be a numeric assessment of risk assigned to a risk item, as part of Failure Modes and Effects Analysis after corrective actions and preventive actions have been implemented and completed. The RRPN is calculated by multiplying residual severity ranking, occurrence ranking, and detection ranking.

Residual Student Discipline Ranking (RSDR) can be a numeric assessment of student discipline ranking assigned after corrective actions and preventive actions have been implemented and completed.

Safety can be a freedom from unacceptable risk.

School Security Officer is responsible for ensuring the safety, security, and welfare of students, faculty, staff, and visitors in an assigned school.

School Security Staff is group of assigned staff members whose job is to create safety plan and protect a school from crime. It also includes school security officers.

Student discipline ranking can a be measure of the possible consequences of a student bad behavior.

Single board microcomputer or microcomputer is a complete computer built on a single board with microprocessors(s), memory, input/output(I/O), sensors and other features required of a functional computer.

Sensor is a device that detects or measures a physical property and records, indicates, or otherwise responds to it.

Severity can a be measure of the possible consequences of a hazard.

Smart Student ID Card is a card giving identifying data about a student or a person, as student ID, expiration date, full name, grade, address, date of birth, sex, color of hair, color of eyes, height, weight, a photograph, and so on for use as identification at a place of school, library, facility, company etc. The information can be either in printed or digital form in the chip to protect the identity of the person. It is used to report crime alerts, unlock doors, pay for meals, record attendance, check books out from the library and so on. It can be used to gain entry to an area having automated access control entry points.

Structured prediction is a supervised learning technique that involves predicting structured objects by means of observed data in which true prediction value is used to adjust model parameters. For example, the structured objects can be student instructional format attributes. The true prediction is made based on the student preference for a given instructional format.

Student Attribute can consist of personal profile, performance, cognitive skills, behavior, genetic, physiological characteristics, family background, personal interest and instructional format.

Exemplary Systems and Methods

The disclosed Smart Campus Security Shield System invention runs on an end to end application workflow. First, the real-time data of the Smart Student ID Card, for example, location, is collected. Simultaneously, in case of crime when a panic button is pressed, a crime alert severity, student ID number, name, location, date, and time information are sent to the Smart Campus Security Shield System Cloud Server. The crime alert is also received by the school security staff through Smart Campus Security Shield Software. The system can also be pre-programmed to send the crime alert directly to emergency responders in case of an active shooter. The panic button is usually pressed by the student in danger. The school security staff is responsible for associating the crime alert with the student who was involved with it. The system automatically classifies the risks and generates risk control measures in the form of corrective actions and preventive actions. The school security staff can also edit, update or delete the student corrective actions and preventive actions. This risk control measure information is also used to monitor the behavior of the students. Lastly, the Smart Campus Security Shield System safety performance data received through the software system is analyzed and monitored to eliminate or reduce the crime.

In one aspect, there is a Smart Campus Security Shield System comprising many Smart Student ID Cards is used for accumulating crime alerts. Sensors that are connected to the Smart Student ID card use a wireless network to send and receive data which is used to calculate effective emergency responders routing strategies in case of crime.

The Smart Student ID Card sensor arrangements can determine and compute the severity, sending a signal to the cloud server, notifying school security staff that the crime should be addressed. The crime alert information can be accessed through Smart Campus Security Shield Software or text messages sent to the school security staff mobile phones.

The Smart Campus Security Shield System allows for school to monitor their school discipline data and security staff to improve student behavior. This is achieved by implementing risk control measures in place for the students that have committed crime.

The Smart Campus Security Shield System preventive actions can reduce money spent for school crime control and harm to student or teacher.

The system can improve public safety around school neighborhood. This can prevent harm to pedestrians and residents.

In addition to this, the disclosed invention can provide live statistics and feedback from the monitored Smart Student ID Card, such as information regarding the student location, ID, name and crime alert severity.

The disclosed invention enables school security staff to play enforcement roles by actively monitoring the students with bad behavior in school and potentially act as mentors to produce desirable positive social behaviors and reduce crime.

The Smart Campus Security Shield System is capable of automatically sending the student discipline data to the state or federal crime alert systems through the Application Programmer Interfaces (API).

The system sends real-time status information to the cloud server and is stored in the database. This information is available to the user via the Smart Campus Security Shield Software.

The schematic flow chart diagrams included herein are generally set forth as logical flow chart diagrams. As such, the depicted order and labeled steps are indicative of one embodiment.

FIGS. 1-18 illustrate examples of a Smart Campus Security Shield System, according to some embodiments. Smart Campus Security Shield System includes smart student ID card, school map, student's location, emergency responder's locations, school security staff, cloud servers containing software application, methods, algorithms, and databases.

The Smart Campus Security Shield System 100 comprises a Smart Student ID Card 300 with a set of sensors inside as shown in the Smart Student ID Card Internal Section View 400. The set of sensors sending a crime alert through a wireless network to a Smart Campus Security Shield Cloud Server 112 when the panic buttons 326-336-346 are pressed.

The Smart Campus Security Shield Cloud Server 112 memory comprises a student crime alert model as illustrated in Crime Alerts Table 1240, which describes a crime alert severity, student ID number, name, location, date, time, and student details.

There is a student risk control model as shown in Student Actions Table 1250, which generates a plurality of corrective actions and preventive actions for each individual student.

The machine learning model implements a Crime Alerts Personalized and Adaptive Machine Learning Method 900. The Personalized Machine Learning Method 910 and Adaptive Machine Learning Method 920 presents a set of customized corrective actions and preventive actions to a student based on at least one student attribute data. If a student attributes data is missing a probabilistic model is used.

Set of student safety performance statistics are generated using computing environment 1300 for an optimal safety management strategy for the School Security Staff 106 to reduce school crime.

FIG. 1 illustrates an example Smart Campus Security Shield System 100 to continuously monitor Smart Student ID Card 300 crime alerts to reduce crime. It depicts a School Map 102 and surrounding neighborhood map. The School Map 102 can display Student 104, School Security Staff 106 and various school locations, such as classrooms, cafeteria, play field, auditorium, swimming pool, administrative offices, crime alert icons, student's locations, emergency responders 108 locations, safety performance data and so on. School Map 102 is also the dashboard view of the Smart Campus Security Shield Software 110 landing page. The Smart Campus Security Shield Software 110 may also have additional administrative functionalities to manage and control user access and databases. The crime alerts information is sent to Smart Campus Security Shield Cloud Server 112.

When a crime occurs, the corresponding icon can automatically appear on the map into the exact location it happened. This placement of the icons is implemented using Smart Campus Security Shield Software 110 running on the Smart Campus Security Shield Cloud Server 112. The details of the crime, such as crime alert severity, student ID number, name, location, date, and time data can be automatically entered into the Smart Campus Security Shield Database 1200 when a panic button 326-336-346 is pressed. This data can wirelessly travel to the cloud server and be placed on the school map in the exact location where it happened.

The crime details can be reviewed by School Security Staff 106. If the risk severity of the crime is high, the alert can be sent to Emergency Responders 108. The emergency responders linked to the software are the local police from police stations, medical responders from hospitals, and fire fighters from the fire station. Other types of emergency responders may be added into the system by the school administration. One or more of the emergency responders can be called to the scene depending on the crime type.

Figure 2:
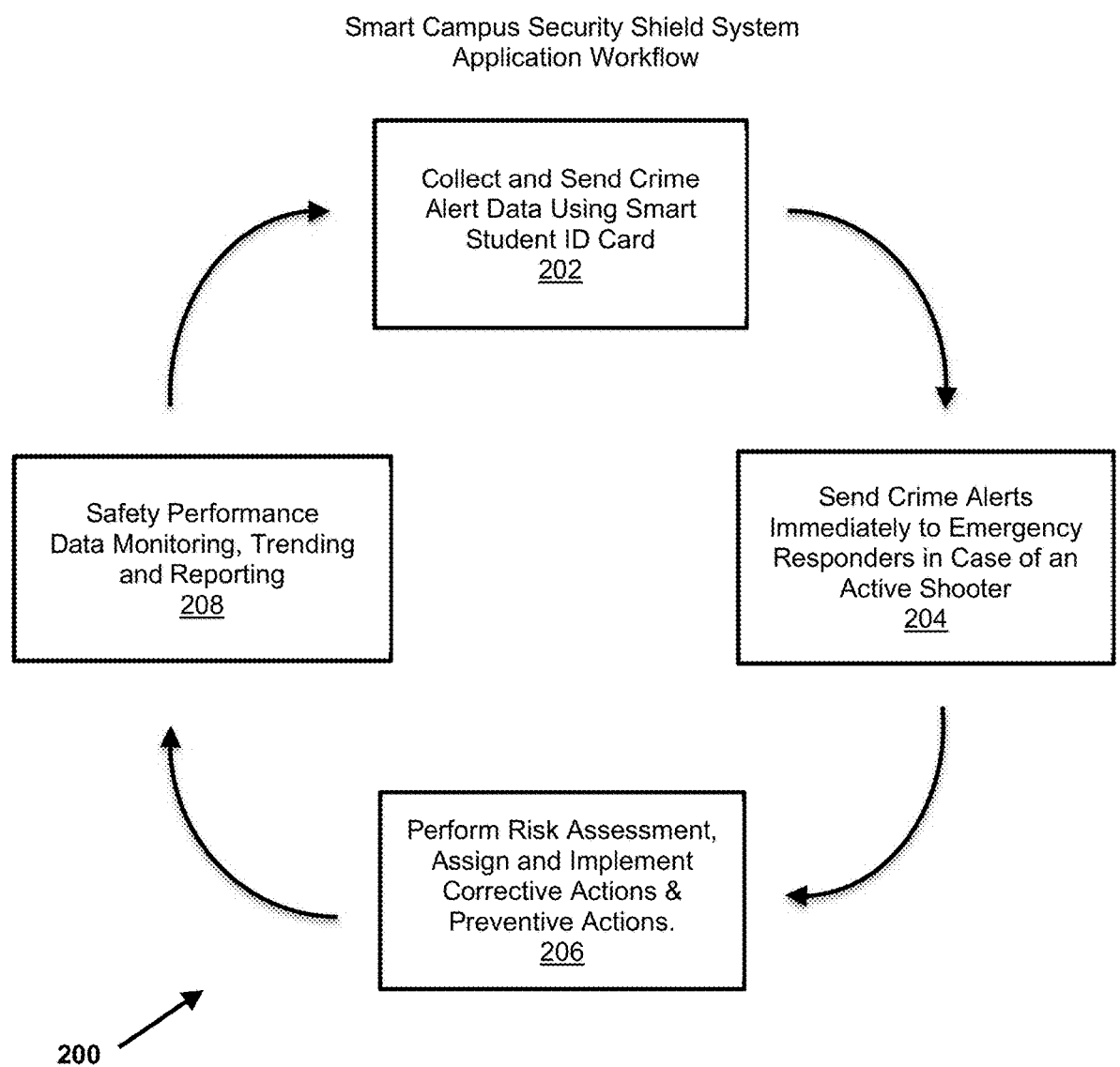
FIG. 2 depicts an exemplary Smart Campus Security Shield System Application Workflow that can be configured to receive Smart Student ID Card crime alerts and perform any computations to reduce crime, according to some embodiments.

FIG. 2 depicts an exemplary Smart Campus Security Shield System Application Workflow 200 that can be configured to receive Smart Student ID Card 300 crime alerts and perform any computations to reduce crime, according to some embodiments.

The first step 202 of the application workflow is to collect and send crime alert data using a Smart Student ID Card 300.

The Smart Student ID Card 300 includes various sensors, such as, inter alia: RFID tag, location sensors, and panic buttons consisting of touch sensors and push buttons. When a Smart Student ID Card 300 panic button 326-336-346 is pressed, panic button sends a crime alert severity, student ID number, name, location, date, and time to the Smart Campus Security Shield Cloud Server 112. Notification is sent to the School Security Staff 106 through the Smart Campus Security Shield Software 110.

The second step 204 of the application workflow is to route a crime alert severity, student ID number, name, location, date, and time automatically to emergency responders in case crime alert type is active shooter. When a student 104 presses a panic button on the Smart Student ID card 300, a crime alert is sent to be reviewed by the School Security Staff 106. The crime alert severity can be catastrophic (5) or critical (4) or serious (3). If the crime alert severity is catastrophic (5) it indicates active shooter requiring intervention of emergency responders 108. The School Security Staff 106 is also responsible for association of the crime alert with the student who committed it. The School Security Staff 106 can choose to enter and assign crime alert severity of Minor (2) or Negligible (1) for student's disruptive behavior.

The third step 206 of the application workflow involves student's Risk assessment and assignment, refinement and implementation of corrective actions and preventive actions using Crime Alerts Personalized and Adaptive Machine Learning Method 900 to reduce or avoid further crimes. A Risk Priority Number (RPN) is assigned for each crime alert type and is calculated by an algorithm which factors crime alert severity, occurrence, and detection ranking. The RPN may be classified as intolerable, as low as possible, and broadly acceptable.

The fourth step 208 of the application workflow aggregates the Smart Campus Security Shield System 100 safety performance data for monitoring, trending and reporting results. The safety performance reports consist of school disciplinary trends like expulsion, suspension, referrals, disruptive behavior, and positive behavior. The report also consists of trends associated with location and severity of the crime. The summary data can be visualized in the form of daily, weekly, monthly, yearly or user queried time range reports. Safety performance results are generated using data stored in the databases.

Figure 3:
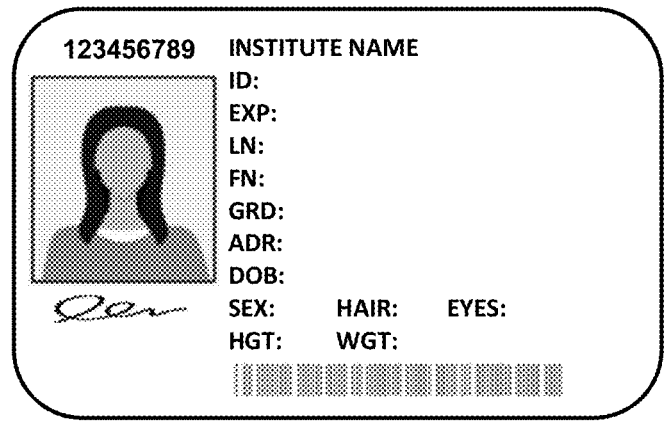
FIG. 3 is a diagram of a sample Smart Student ID Card Front View and Smart Student ID Card Back View that can be utilized to implement various embodiments.
Figure 3:
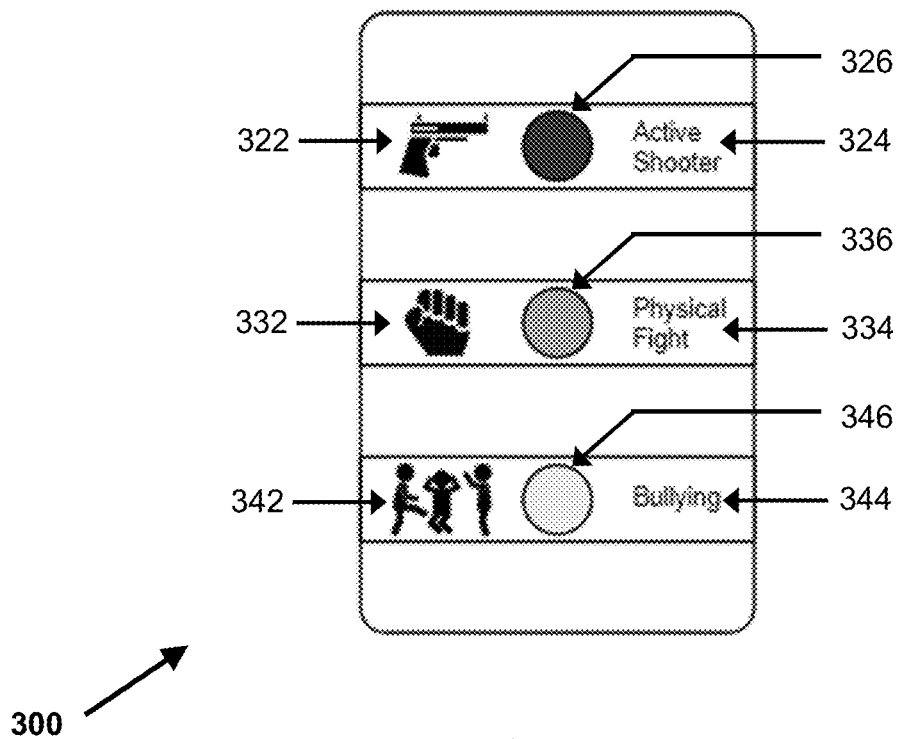

FIG. 3 is a diagram of a sample Smart Student ID Card Front View 310 and Smart Student ID Card Back View 320 that can be utilized to implement various embodiments.

The Smart Student ID Card 300 comprises a front side Smart Student ID Card Front View 310 where student information is printed and a back side Smart Student ID Card Back View 320 consisting of three panic buttons 326-336-346. A Microcomputer 402 is programmed with student information and the three panic buttons 326-336-346 are programmed with a severity number. Any color can be printed on top of the three panic buttons 326-336-346. Also, any icon and text can be printed on the either side of three panic buttons The student information is printed in the front of the card and stored in digital format in the Microcomputer 402 memory, according to some embodiments. More specifically, Smart Student ID Card Front View 310 includes a picture, signature, barcode, the student's ID number, expiration date (EXP), last name (LN), first name (FN), grade (GRD), date of birth (DOB), sex (SEX), hair color (HAIR), eye color (EYES), height (HGT), weight (WGT) and so on. The look of this card, along with the information on it, can be lessened to make it include only a picture, a barcode, the school's name, the student's ID, and grade, or any other information of the student deemed pertinent by the school. To protect the privacy of the student or person, the Smart Student ID Card 300 may not have any printed personal data. It might be blank or might only contain the school or facility logo, name and so on. The student data is also stored in a digital format inside the Microcomputer 402 memory in the card. The Smart Student ID Card 300 can also be customized as a facility access badge for facilities like offices, company, industrial, educational, government, airports, hospitals, amusement park, sports stadium, residential buildings and so on.

In certain scenarios, where students have mobile phone or devices, the Smart Student ID Card 300 functionality can be Smart Student ID Card App which can be installed on mobile devices like phones, notepads, laptops and so on. The App mimics the complete functionality of Smart Student ID Card 300. The Smart Student ID Card App has same look and feel as that of the Smart Student ID Card Back View 320.

The Smart Student ID Card Back View 320 is portraying an example of the three (3) different panic buttons that can be displayed; namely—active shooter panic button 326, physical fight panic button 336, and bullying panic button 346 to report such crimes. Each panic button surface has a different color, for example they can be red, orange, and yellow respectively, allowing students to distinguish between three (3) different crime types.

The Smart Student ID Card Back View 320 includes three (3) icons which may be a pistol 322, first 332, and children kicking children 342. These three (3) icons are displayed on the left side of the ID Card. The Smart Student ID Card Back View 320 also includes three (3) printed text which are Active Shooter 324, Physical Fight 334, and Bullying 344. These three (3) texts are displayed on the right side of the ID card. The icons match up to the texts respectively.

The panic buttons only work when they are touched and pressed by the finger, thus reducing false positive. This eliminates the chance of a false crime alert getting sent to the School Security Staff 106 or emergency responders.

The Smart Student ID Card Back View 300 is designed in a way so that the three (3) icons and (3) texts that are displayed are customizable. Schools may change the icons and texts to their desire. For example, if in a school drug use is common, a school can change one of the icon to drug icon and corresponding text to read as "Drug Abuse". In another example, if a gang violence is common in a school's location, a school can change one of the icon to gang violence icon and corresponding text to read as "Gang Violence" instead.

The Smart Student ID Card 300 is made up of plastic, leather, metals or any other suitable material with three (3) different panic buttons 326-336-346 on the back. The Smart Student ID Card 300 front and back is blank so that it can be customized as Smart ID Card for use in schools as well as in aspects of everyday life in facilities like offices, company, industrial, educational, government, airports, hospitals, amusement park, sports stadium, residential buildings and so on.

A Smart Student ID Card can be programmed to work as a Smart ID Card. Smart ID Card can be a physical card as well as Smart ID Card mobile app. A Smart ID Card is programmed to provide access to a facility building where a Smart Campus Security Shield Software user interface is customized to a facility building type. Further a Smart ID Card three panic buttons can be programmed to a set of customized crime alert types and are printed with a set of customized icons and texts. When a Smart ID Card panic button is pressed, it sends a crime alert severity, ID card number, name, location, date, and time to the facility security staff.

Figure 4:
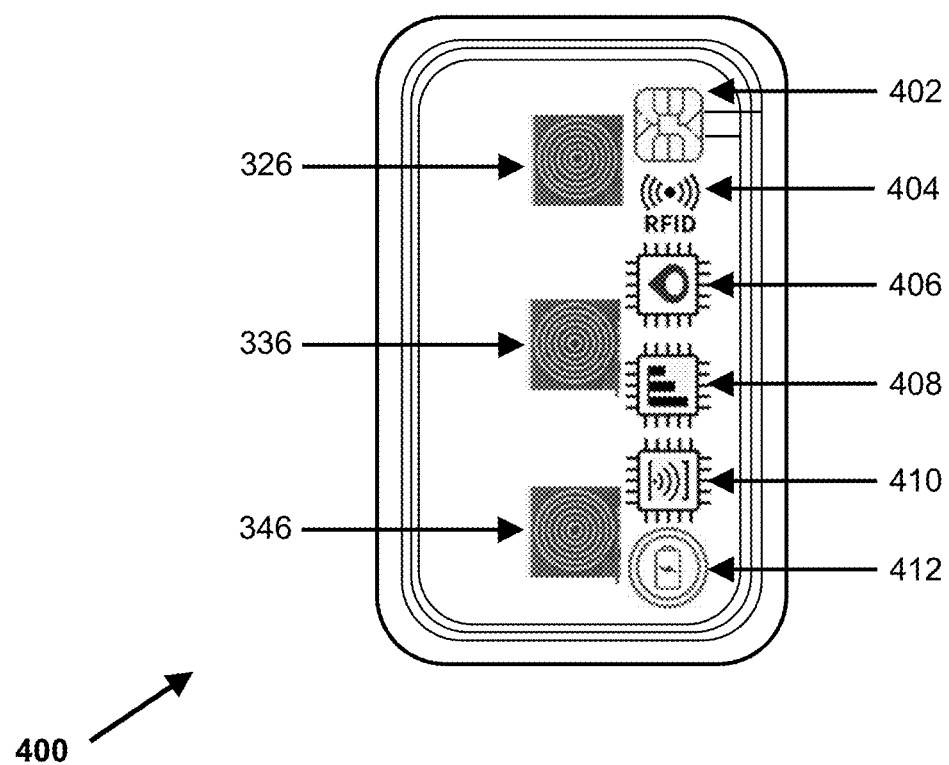
FIG. 4 is an exemplary Smart Student ID Card Internal Sectional View of the present invention showing the hardware components and sensors of the device, according to some embodiments.

FIG. 4 is an exemplary Smart Student ID Card Internal Sectional View 400 of the present invention showing the hardware components and sensors of the device, according to some embodiments The Smart Student ID Card Internal Sectional View 400 shows active shooter panic button 326, physical fight panic button 336, and bullying panic button 346, a Microcomputer 402, a RFID Tag 404, a GPS Chip 406, a Cellular Chip 408, a Wi-Fi Chip and Bluetooth Chip 410, and a Battery 412.

The Smart Student ID Card 300 has set of sensors with following functionalities: a RFID Tag 404 consisting of student ID number, name and a set of details of the student; a GPS Chip 406 location sensor to determine the student location; a Cellular Chip 408 sensor to connect to the nearest cellular network; a Wi-Fi Chip and Bluetooth Chip 410 sensor to connect with any existing network; Three panic buttons 326-336-346 to send real time crime alert severity, student ID number, name, location, date, and time. The set of sensors sends type-specific data to the Smart Campus Security Shield Cloud Server 112.

The Smart Student ID Card 300 RFID Tag 404 comprises a student ID number, a name and a set of details of the student.

The Smart Student ID Card 300 GPS Chip 406 location sensor sends a geo-spatial position of the student to the to the Smart Campus Security Shield Cloud Server 112.

The Smart Student ID Card 300, three panic buttons 326-336-346 crime alert type severity number is set to active shooter=5, physical fight=4, and bullying=3.

The panic button consists of a touch sensor and a push button. The three (3) touch sensors used in the card are placed externally, unlike the other circuitry. Touch sensors are placed directly on top of the push buttons. When both the touch sensor and push buttons are pressed, an alert with a specific crime type is sent to the Smart Campus Security Shield Cloud Server 112. This method of placement reduces false positives. A crime alert can only be sent if the touch sensor and push button are pressed. For example, if the panic button on the Smart Student ID Card 300 is pressed accidentally or unintentionally through any means, an alert cannot be sent because the touch sensor on the card, which requires a human's touch, was not touched with the finger. Similarly, if a student is taking his or her Smart Student ID Card 300 out of their bag and simply touches the touch sensor, a crime alert cannot be sent because the push button part of the panic button was not pressed.

These panic buttons 326-336-346 are connected to the Microcomputer 402 and RFID Tag 404. When a panic button is pressed, data from the Smart Student ID card 300 is sent to the Smart Campus Security Shield Cloud Server 112. This data includes crime alert severity, which is gathered from the panic button that was pressed. The data also includes student ID number, name, location, date, and time. A button is considered positive when it is touched and pressed by the human finger. In the case that a button is positive, the Microcomputer 402 can read the RFID Tag 404 and send the students ID number, while the GPS can also record and send the student's location. RFID at minimum can contain the student ID number information and in other cases can include the complete student details like name, age, grade and so on. Microcomputer 402 can contain all the student details data in its memory.

In some embodiments, the student information can be directly stored into the Microcomputer 402 memory and RFID Tag 404. The crime alert data consists of student information. This way, the School Security Staff 106 can identify who sent the alert, speak with them for more information, and assign disciplinary actions like expulsion, suspension, referrals, and disruptive behavior to the right student.

The GPS Chip 406 identifies the location of the student who pressed the panic button. When an alert is sent, the GPS Chip 406 can track the Smart Student ID Card 300 location and send it to the Smart Campus Security Shield Cloud Server 112 and store it in the Smart Campus Security Shield Software Database 1200. Through this Smart Campus Security Shield Software Database 1200, the crime can be shown on the Smart Campus Security Shield Software 110 on a School Map 102 in the exact place it happened.

The Cellular Chip 408 and Bluetooth Chip and Wi-Fi Chip 410 enable the data from crime alerts to be sent wirelessly to the Smart Campus Security Shield Cloud Server 112 and notify the School Security Staff 106 through the Smart Campus Security Shield Software 110.

The Battery 412 powers the circuitry in the card. The Battery 412 powers all the components of the Smart Student ID Card 300, so that it can function.

The Smart Student ID Card 300 can be programmed to work within a pre-determined area. This is done by making use of geofencing. A virtual boundary around a specified location in GPS Chip 406 enabled software is established. For example, this can be 500 meters around a location on maps. The virtual geofence will then enable or disable service when a student enters or exits that area.

The Smart Student ID Card 300 virtual geofencing can be used to record a student school entry and exit date and time.

The Smart Student ID Card 300 can be used to record a student school attendance through RFID Tag 404 when they enter through the school gates.

The Smart Student ID Card 300 can be used as a school facility access card to enable access to buildings, controlled areas, library and computer systems. This is done using RFID Tag 404 which use radio frequencies to enable access from a programmed short distance through RFID reader.

The Smart Student ID Card 300 can be used for pre-programmed meal plan. In this case Microcomputer 402 is programmed with the meal plan or as an electronic purse, to pay for at canteens, vending machines and so on.

The Smart Student ID Card 300 can be used for library book check out. The student has to first swipe the card through the library checkout system. Once the authentication is complete, the books can be checked out.

The Smart Student ID Card 300 information can be remotely erased, deactivated or reprogrammed through the System Administration 716. This is achieved by accessing a given student's Smart Student ID Card 300 through a WIFI or Cellular network and then sending a task specific signal of erase, deactivate or reprogram to the associated Smart Student ID Card 300.

The Smart Student ID Card 300 can be programmed to work as Smart ID Card to provide access to a facility building. The Smart Campus Security Shield Software 110 user interface can be customized based on the facility type. In addition, since initially hardware does not contain any information, the Smart ID Card three panic buttons can be programmed to customized crime alert type and printed with customized icons and texts. When the Smart ID Card panic button is pressed, it sends crime alert severity, Smart ID number, name, location, date, and time to the facility security staff.

Figure 5:
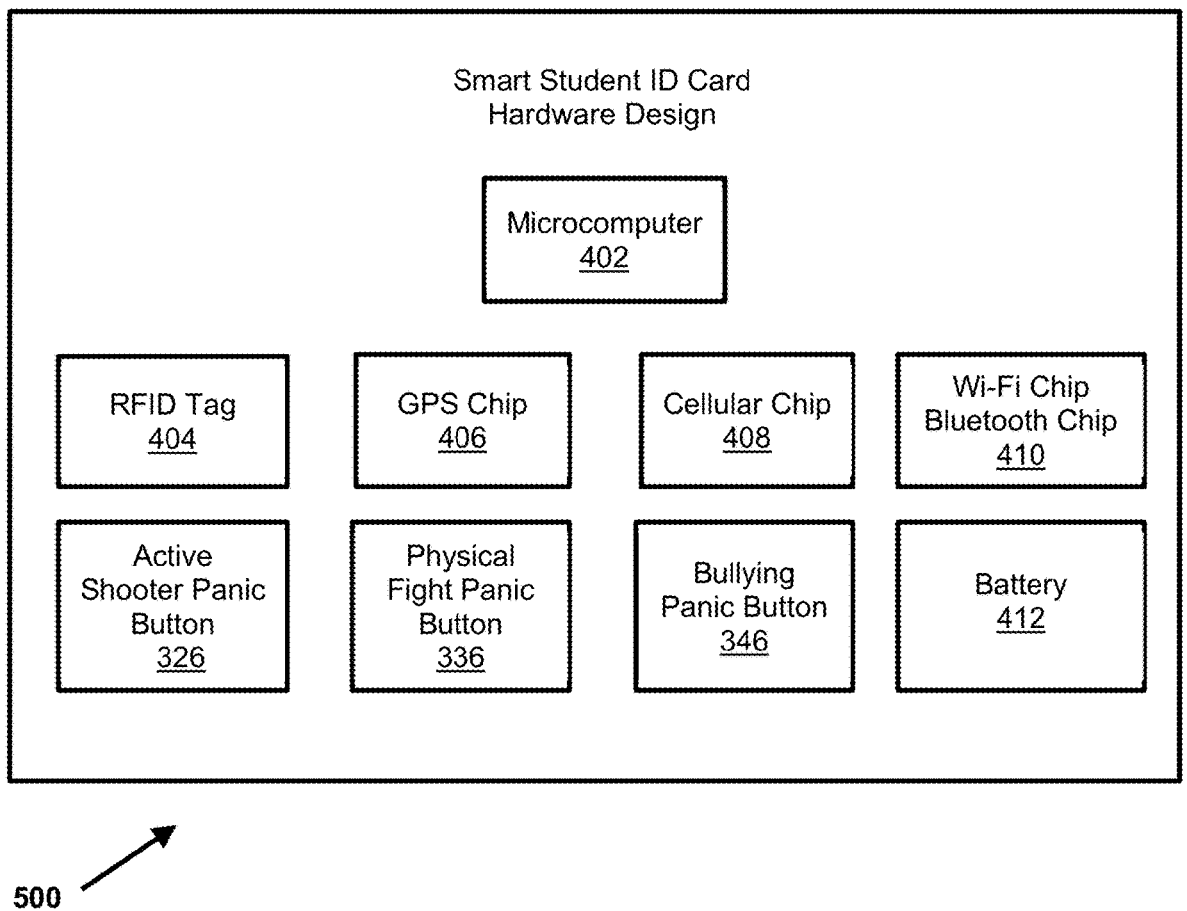
FIG. 5 is an exemplary Smart Student ID Card Hardware Design showing the hardware components and sensors block diagram that can be utilized to implement various embodiments

FIG. 5 is an exemplary Smart Student ID Card Hardware Design 500 showing the hardware components and sensors block diagram that can be utilized to implement various embodiments.

The embodiments include a Microcomputer 402, RFID Tag 404, a GPS Chip 406, a Cellular Chip 408, a Wi-Fi Chip and Bluetooth Chip 410, active shooter panic button 326, physical fight panic button 336, and bullying panic button 346, and a Battery 412. All of these embodiments are connected in a way that makes Smart Student ID Card 300 function.

Figure 6:
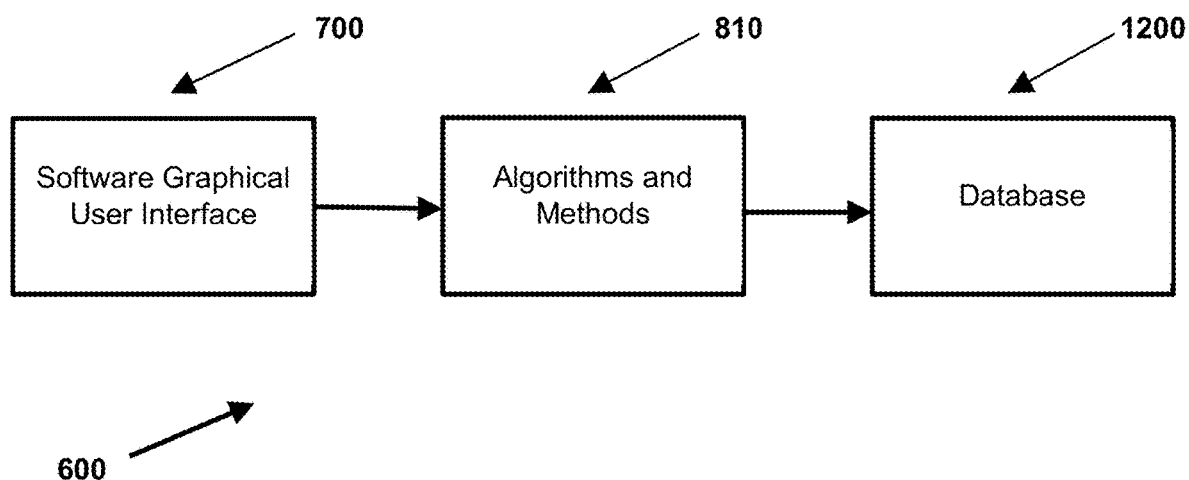
FIG. 6 illustrates an example Smart Campus Security Shield Software Architecture including software graphical user interface, algorithms, methods and database, according to some embodiments.

FIG. 6 illustrates an example set of Smart Campus Security Shield Software Architecture 600 including Software Graphical User Interface 700, Algorithms and Methods 810, and Smart Campus Security Shield Software Database 1200.

The Software Graphical User Interface 700 displays a School Map 102 with real-time crime alerts and various performance statistics, such as disciplinary trends, risk trends, location and severity of crimes. To organize this data, the interface design includes different accessible menu items; for example: Dashboard with School Map 702, Student Crime Alerts 704, Student Corrective Actions and Preventive Actions 706, Safety Performance 708, Emergency Responders Details 710, School Safety Plan 712, External Threat and Internal Threat 714, and System Administration 716.

The Algorithms and Methods 810 analyze, process, and display the collected crime alert data to the user. They also aggregate and extrapolate the necessary data to show disciplinary actions like expulsion, suspension referrals, disruptive behavior, positive behavior and associated risk trends.

The Smart Campus Security Shield Software Database 1200 can also process collected crime alerts. It stores data and statistics which can later be accessed by the user.

Figure 7:
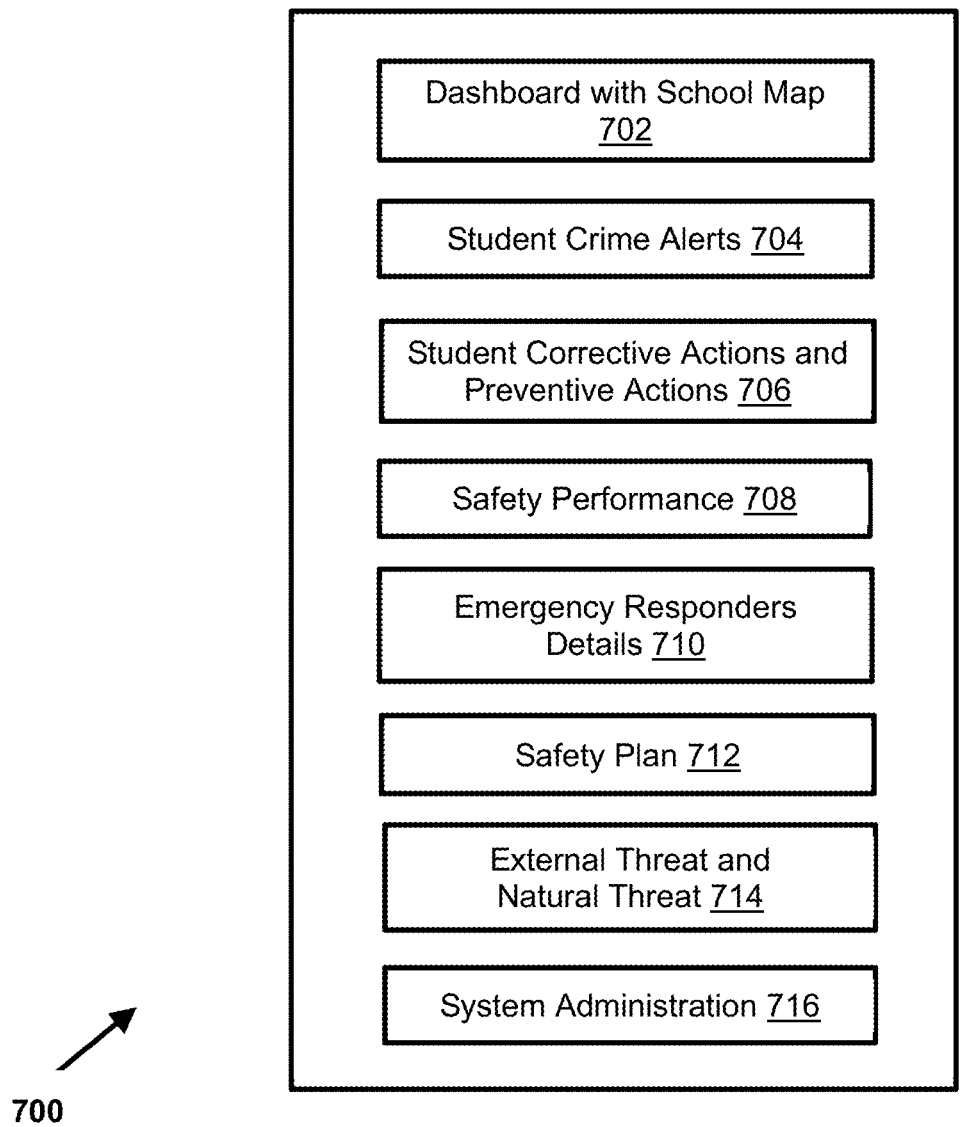
FIG. 7 illustrates an example Software Graphical User Interface of the Smart Campus Security Shield System with menu items, according to some embodiments.

FIG. 7 illustrates an example of a user activated Software Graphical User Interface 700 of the Smart Campus Security Shield System 100 with menu items, according to some embodiments. It includes various menu items such as Dashboard with School Map 702, Student Crime Alerts 704, Student Corrective Actions and Preventive Actions 706, Safety Performance 708, Emergency Responders Details 710, School Safety Plan 712, External Threat and Internal Threat 714, and System Administration 716.

The Smart Campus Security Shield System 100 landing page includes a School Map 102 in which real-time crime alert icons and locations are displayed and the software user interface allows for access to a Student Crime Alerts 704, a Student Corrective Actions and Preventive Actions 706, a Safety Performance 708, an Emergency Responders Details 712, a Safety Plan 712, External Threat and Natural Threat 714 information and System Administration 716 functionality.

Clicking on menu item Dashboard with School Map 702 displays a School Map 102 and the surrounding police stations, hospitals, and fire stations. When a panic button is pressed on a personal Smart Student ID Card 300, real-time crime alerts appear on the map in the location it was pressed, with the corresponding icon crime type. The user may hover over the icons for a complete set of details regarding the crime. The details include crime alert type, severity, student ID number, name, location, date, and time.

Clicking on menu item Student Crime Alerts 704 displays an organized tabular list of most recent crime alerts reported by the students to be reviewed by School Security Staff 106.

Page displays the information based on a student crime alert model which describes a crime alert severity, student ID number, name, location, date, time, and a set of details of the student. Each row of the table may consist of, a student ID number, first name, last name, crime alert type, location of crime, crime date, false positive warning, safety problems, severity, failure effects, and so on. The information allows School Security Staff 106 to respond to crime alerts hot spots.

Clicking on menu item Student Corrective Actions and Preventive Actions 706 displays page with an organized tabular list of student details and appropriate corrective actions and preventive actions that have been generated using Crime Alerts Personalized and Adaptive Machine Learning Method 900. Page displays the information based on a student risk control model which generates a plurality of corrective actions and preventive actions for each individual student. Each row of the table may consist of information regarding, a student ID number, first name, last name, crime alert type, location of crime, crime date, false positive warning, safety problems, severity, failure effects, severity, root causes, occurrence, detection, RPN, disciplinary action, corrective actions, preventive actions, residual severity, residual occurrence, residual detection, RRPN, and residual discipline ranking. The information allows School Security Staff 106 to monitor crime alerts data by proactively reviewing and evaluating corrective actions and preventive actions to ensure appropriate resources are allocated and implemented. The page also provides important information about disciplinary trends after corrective actions and preventive actions are implemented.

Clicking on menu item Safety Performance 708 displays safety performance statistics in the form of graphs and charts calculated from student crime alerts data stored in the Smart Campus Security Shield Software Database 1200 system. The graph and charts may consist of the student disciplinary and safety risks trends before and after corrective actions and preventive actions have been implemented, crime alert type trends, location and severity of crimes, and so on.

Clicking on menu item Emergency Responders Details 710 displays an organized list and record of local school security officers, School Security Staff 106, police stations, hospitals, and fire stations. The information is displayed in the form of table. Each row of the table may consist of information regarding, an emergency responder type, address, name, telephone, email contact and so on. There is one click hot link to mobile number to either send a text or call a given emergency responder.

Clicking on menu item School Safety Plan 712 displays an action and logistical plan for the school in the case of an evacuation during an emergency. It may consist of the following: a chain of command to be followed based on different administrative roles and responsibilities; a crime command structure to organize evacuation operations, logistics, planning, and finances; School site emergency evacuation map to demonstrate efficient emergency exit routes; site plan exercise and emergency drill to log various emergency drills conducted; safe ingress and egress to foster awareness and safety for transportation to and from school; and evacuation procedures in the case of a lock down or shelter in place. All of this information is also available to emergency responders 108.

Clicking on menu item External Threat and Natural Threat 714 displays the external threat information like shooting, theft, burglary, bomb threats, stalking around school, suspicious activities near the school vicinity and so on. The natural threat provides information regarding school bus incidents, fires, explosions, flash flooding, winter storms, earthquakes and so on. The external threat and natural threat information is displayed in the form of neighborhood crime map, crime listing and natural threat listing. It also includes link to universal community crime map and crime reports.

Clicking on menu item System Administration 716 displays system administration screen which allows system administrator to add, delete, update or deactivate the user profile. It also allows system administrator to grant or deactivate various software user interface functionality for a given user. For example, school security officer might need access to complete software functionality whereas other school staff like teachers may need access to only editing of corrective actions and preventive actions.

Figure 8:
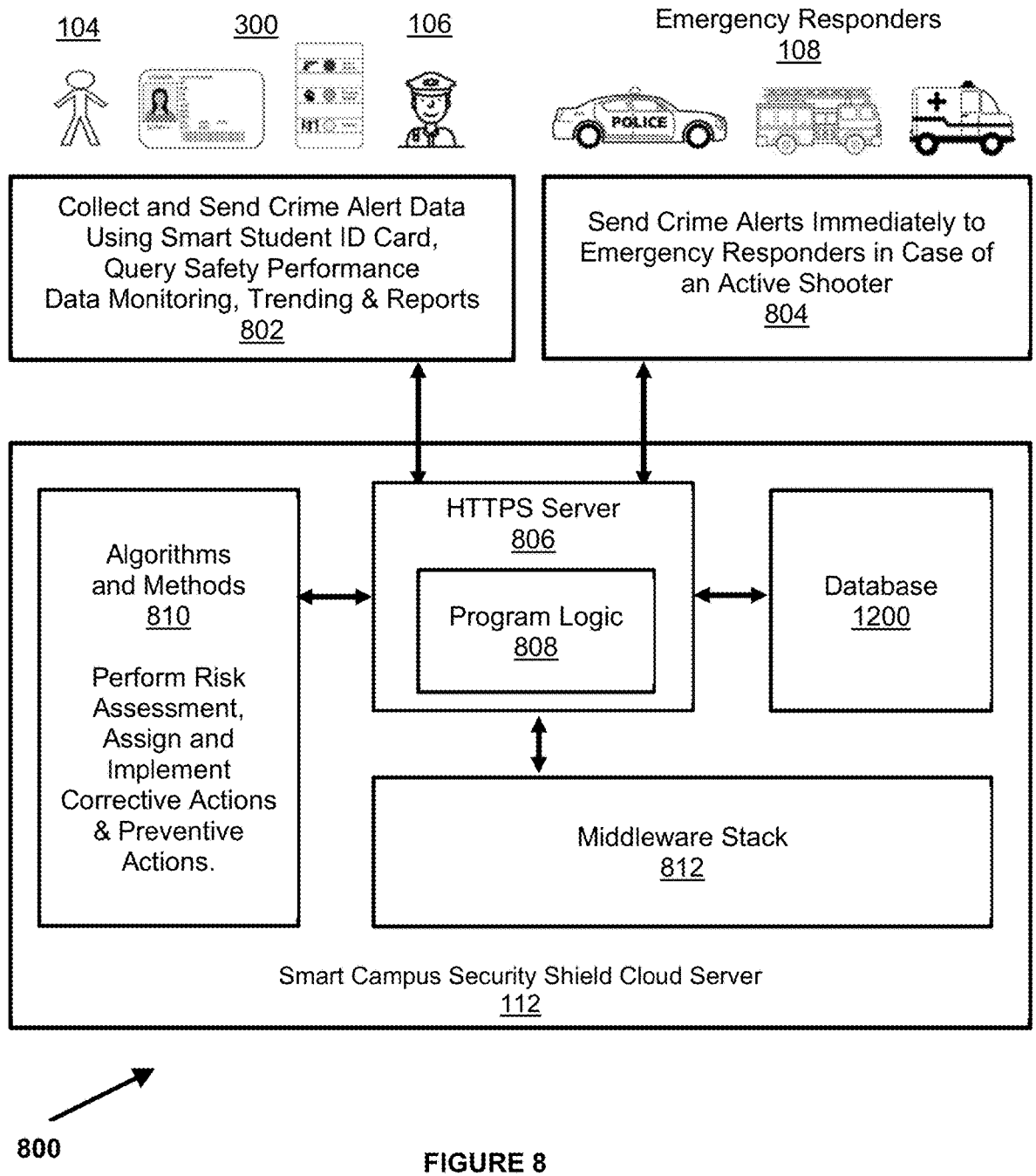
FIG. 8 illustrates an example set of Smart Campus Security Shield System Software Design components, according to some embodiments.

FIG. 8 illustrates an example set of Smart Campus Security Shield System Software Design 800 components of the Smart Campus Security Shield Software 110. In case of crime, Student 104 presses the panic button of the Smart Student ID Card 300 which sends the sensor data to the Smart Campus Security Shield Cloud Server 112. The data is processed through specific Algorithms and Methods 810 in the cloud server and sent to the Smart Campus Security Shield Software Database 1200 system to be stored. The Algorithms and Methods 810 module is responsible performing risk assessment, assignment and implementation of corrective actions and preventive actions. The crime alert is received by the School Security Staff 106. If the risk severity of the crime is high, the alert can be sent to emergency responders 108. The system can also be pre-programmed to send the crime alert directly to Emergency Responders 108 in case of an active shooter. The data can be accessed by the user through the Software Graphical User Interface 700. The HTTPS Server 806 is used for secure communication over a computer network between client and server. Program Logic 808 preforms decision making based on crime alerts data and allows to branch to different part of the program. Middleware stack 812 acts as a bridge between operating system, database and application to display the data rapidly.

Figure 9:
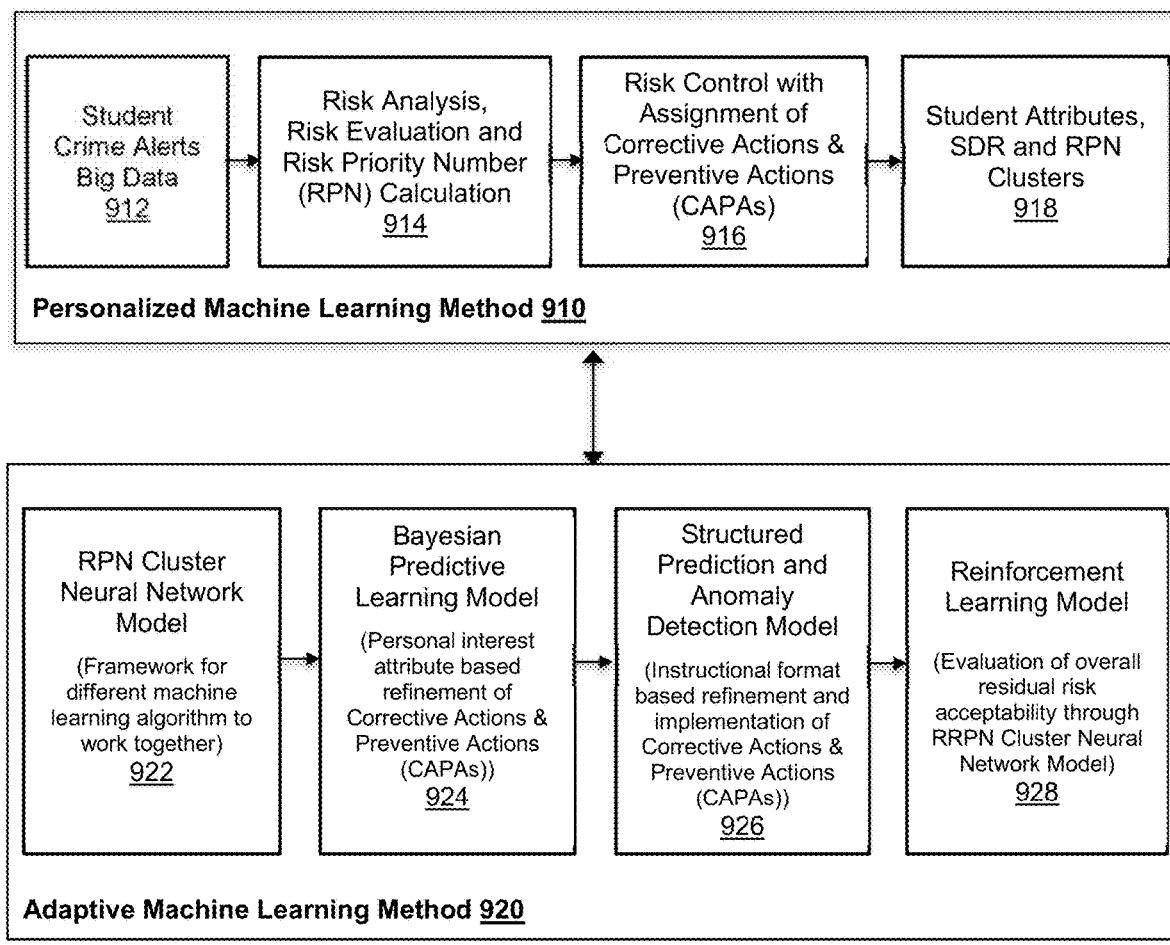
FIG. 9 illustrates Crime Alerts Personalized and Adaptive Machine Learning Method to create customized corrective actions and preventive actions based on crime alerts for a student, according to some embodiments.

FIG. 9 illustrates Crime Alerts Personalized and Adaptive Machine Learning Methods 900 to create customized corrective actions and preventive actions based on crime alerts for a student, according to some embodiments. It includes the Personalized Machine Learning Method 910 and Adaptive Machine Learning Method 920. For the model to provide meaning corrective actions and preventive actions, there should be at least one attribute data from any of the attributes like personal profile, performance, cognitive skills, behavior, genetic, physiological characteristics, family background, personal interest and instructional format. If a student attributes data is missing a probabilistic model is used. It can also be assigned by mean or median value based on all the student's data.

The Personalized Machine Learning Method 910 comprises a set of student corrective actions and preventive actions based on a set of attributes of the student.

The Adaptive Machine Learning Method 920 comprises a set of student customized corrective actions and preventive actions based on a student personal interest and instructional format attribute.

The Personalized Machine Learning Method 910 consists of four procedural steps.

In the first procedural step Student Crime Alerts Big Data 912 consists of user entered student's attribute data and crime alerts data generated through Smart Student ID Card 300.

In the second procedural step Risk Analysis, Risk Evaluation, and Risk Priority Number (RPN) Calculation 914 is performed. The severity, occurrence, and detection rankings for corrective actions and preventive actions are auto assigned as per Tables 142-144-152. The ranking values range from 1 to 5. The Risk Priority Number (RPN) is calculated using formulae as below:

$$RPN = \text{Severity Ranking} \times \text{Occurrence Ranking} \times \text{Detection Ranking}$$

The RPN ranges are listed in the Table 154. The RPN upper limit value is 125 and lower limit value is 1. The RPN ranges are categorized as Intolerable (INT)=45-125, As Far As Possible (AFAP)=16-44, and Broadly Acceptable Region (BAR)=1-15.

The student discipline rankings as per Table 162 for corrective actions and preventive actions are auto assigned.

The third procedural step involves Risk Control with Assignment of Corrective Actions and Preventive Actions (CAPAs) 916. The assignment is based on overall student attributes data like personal profile, performance, cognitive skills, behavior, genetic, physiological characteristics, family background, personal interest and instructional format. This helps in grouping the students with similar disciplinary actions and reduces the cost of corrective actions and preventive actions implementation. Table 172 lists exemplary corrective actions and preventive actions for a crime alert type of active shooter, physical fight, and bullying. The example also contains initial assigned values labeled as "Before CAPAs Implementation" for Severity Ranking, Occurrence Ranking, Detection Ranking, RPN, and SDR.

Last step of the procedure involves Student Attributes, SDR, and RPN Clusters 918 creation. The corrective actions and preventive actions are further updated based on school surveillance data from cameras, suspicious activities, parents providing information, and so on. In this step Before CAPAs Implementation Students Discipline Ranking (SDR) Cluster 1110 and Before CAPAs Implementation Students Risk Priority Number (RPN) Cluster 1120 is created.

Adaptive Machine Learning Method 920 consists of four models. These models are responsible for analyzing corrective actions and preventive actions of individual students on a continuous basis and making updates and refinements for better student discipline outcomes.

For example, in the best-case scenario, the RPN value is around BAR and the severity ranking is either 1 or 2. In this case, the student completes a few corrective actions and preventive actions based on personal interest and instructional format attributes and moves to positive behavior category. In the worst-case scenario, the attributes value is around INT and AFAP and the severity ranking might be 5, 4, and 3. In this case, after the initial assignment of the corrective actions and preventive actions, it is extremely important to refine and customize the actions based on Adaptive Machine Learning Method 920. In the case of eLearning instructional format like online learning, these input attribute data play an important role in figuring out the corrective actions and preventive actions content and ensure they can adapt to the student environment by offering appropriate rewards. In the case of a teacher-student interactions, one-on-one coaching, role-playing, debate format, team based format, classroom format, one can visually notice genetic attributes (intellectual disability), physiological attributes (nervousness), and so on which help in further customization of student actions. One important feature of this system is to detect the student disabilities using genetic and physiological attributes data. In the case of a learning disability being present in the student, the system recommends special education to support physical, emotional, and mental well-being.

The first RPN Cluster Neural Network Model 922, is a framework for different machine learning algorithms like supervised learning and unsupervised learning to work together. The supervised learning includes algorithms like regression, Bayesian predictive learning model, and neural network. The unsupervised learning includes algorithm like Apriori and K-means. The model includes the input data as RPN, the initial corrective action and preventive action modules (nodes or neurons), and the output is customized corrective action and preventive action modules for each student. The connection between the input and neurons is called edge. The neurons and edges have weights that adjust as corrective actions and preventive actions are implemented and completed. It is noted that RPN Cluster Neural Network Model 922 framework is based on the self-organizing maps and adaptive resonance theory.

The second Bayesian Predictive Learning Model 924 is responsible for further refining corrective actions and preventive actions based on the individual student personal interest attribute data. The student corrective actions and preventive actions risk control module is further updated. This is done by calculating the probability of a given risk control module resulting in lowering the disciplinary actions, given the probability of the student's personal interest attribute data. If the student is enrolled in the sports which they do not like, then the corrective actions and preventive actions might not be effective. For example, student preference is soccer but is enrolled in basketball team. As listed in Table 182—Exemplary corrective actions and preventive actions is further refined and updated based on the Bayesian Predictive Learning Model 924.

The third Structured Prediction and Anomaly Detection Model 926 chooses the best instructional format for a corrective actions and preventive actions implementation based on student instructional format attributes. If for a given student instructional format attribute values are missing, then a probabilistic model is used to assign a missing value based on other attribute data. After the applicable student risk control modules, have been selected, the Structured Prediction and Anomaly Detection Model 926 uses the individual student's corrective actions and preventive actions presentation format attributes to present instructional methodologies that are consistent with the students' needs. Individual corrective actions and preventive actions are combined to create a set for a group of students for more structured, efficient implementation.

The student corrective actions and preventive actions presentation environment can be based on the instructional format attribute. In some cases, it is independent study, teacher-student interactions, one-on-one coaching, role-playing, debate format, team based format, classroom format, experimental learning, parent tutoring, online learning, watching a video and so on. This refinement is very important because if the student preference is one-on-one coaching, then the corrective actions and preventive actions implemented via video format might not be effective. Student disciplinary assessment is done by comparing a students' actual corrective actions and preventive actions completion achievements with a desired standard of achievement as outlined in the RRPN clustering. An anomaly in a student can be detected based on events or observations which raise suspicion by differing significantly from the majority of student data.

In the fourth Reinforcement Learning Model 928, focus is to maximize the cumulative reward. This is determined by sensing various parameters and student interactions while working on corrective actions and preventive actions. The student reward can be in the form of participation certificate, medals, outstanding athlete award certificate and so on. The evaluation of overall residual risk acceptability through RRPN cluster neural network and RSDR are used to determine the final student disciplinary outcomes, like expulsion, suspension, referrals, disruptive behavior, and positive behavior. The objective is for the student to move to the "positive behavior" category, where there is no student disciplinary action required. The student is also awarded points and grades based on the corrective actions and preventive actions completion.

In summary, the Crime Alerts Personalized and Adaptive Machine Learning Methods 900 focuses on the students' safety performance to find the right balance between current disciplinary actions, like expulsion, suspension, referrals, disruptive behavior, and uncharted territory. The overall disciplinary action count and crime alerts risks should decrease and student should move to positive behavior category. There is a correlation between severity, RPN, RRPN and student disciplinary data like expulsion, suspension, referrals, disruptive behavior, and positive behavior.

Figure 10:
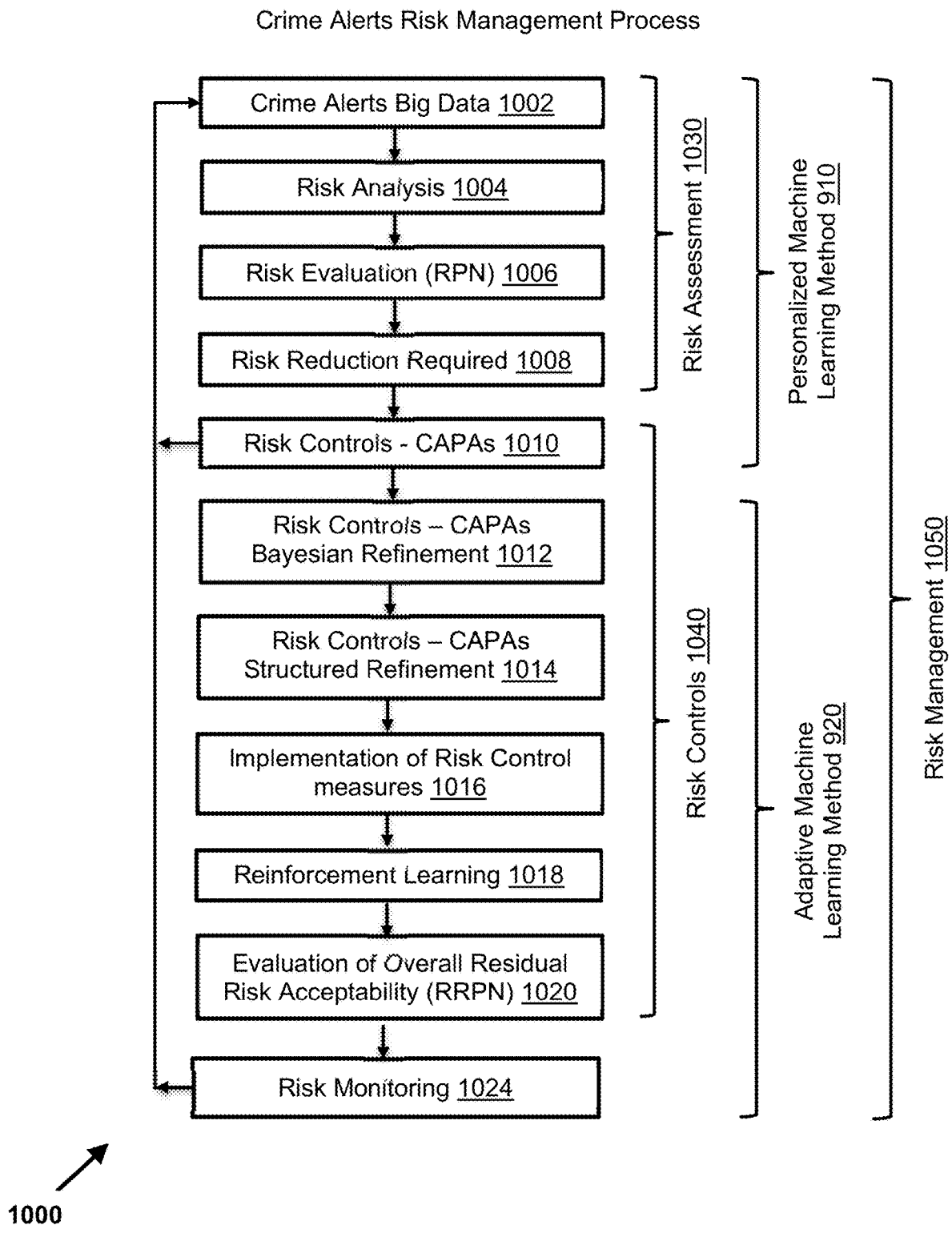
FIG. 10 illustrates Crime Alerts Risk Management Process, according to some embodiments.

FIG. 10 illustrates Crime Alerts Risk Management Process 1000, according to some embodiments. The input to the process is Crime Alerts Big Data 1002. Risk management activities can be performed iteratively or in multiple steps as appropriate to the Crime Alerts Big Data 1002.

The Crime Alerts Risk Management Process 1000 consists of steps 1002-1004-1006-1008-1010 which are part of Personalized Machine Learning Method 910 and process steps 1012-1014-1016-1018-1020 are part of Adaptive Machine Learning Method 920. The complete processing steps are collectively part of Risk Management 1050.

Risk Analysis 1004 process step involves systematic use of available student's Crime Alerts Big Data 1002 to identify hazards and to estimate the risk.

Risk Evaluation (RPN) 1006 process step compares the estimated risk against given risk criteria to determine the acceptability of the risk. The RPN criteria ranges are categorized as Intolerable (INT), As Far As Possible (AFAP), and Broadly Acceptable Region (BAR). The disciplinary actions are also assigned based on crime alert severity and RPN. The assigned disciplinary actions can be Expulsion, Suspension, Referrals, and Disruptive Behavior. Students who reported the crime and were either victim or were not involved in the crime are tagged with the Positive Behavior.

Risk Reduction Required 1008 process step involves review of the identified risks. Some of the student's crime alert risks can be eliminated and other risks requires risk controls in the form of corrective actions and preventive actions.

Risk Controls—CAPAs 1010 process steps is an automated step where measures such as corrective actions and preventive actions are assigned based on overall student attributes like personal profile, performance, cognitive skills, behavior, genetic, physiological characteristics, family background, personal interest and instructional format. [00220] As listed in Table 172—Exemplary corrective actions and preventive actions are assigned based on the Personalized Machine Learning Method 910.

Risk Controls—CAPAs Bayesian Refinement 1012 is a process step in which corrective actions and preventive actions are refined and updated based on the student's personal interest attributes. As listed in Table 182—Exemplary corrective actions and preventive actions is further refined and updated based on the Bayesian Predictive Learning Model 924.

Risk Controls—CAPAs Structured Refinement 1014 is a process step in which corrective actions and preventive actions are further refined and updated based on student instructional format. As listed in Table 182—Exemplary corrective actions and preventive actions is further refined and updated based on the Structured Prediction Learning Model 924.

Implementation of Risk Control measures 1016 is a process step in which corrective actions and preventive actions are implemented by which risks are reduced to, or maintained within, specified levels.

Reinforcement Learning 1018 process step has machine learning technique that rewards the student on successful completion of corrective actions and preventive actions. The student reward can be in the form of participation certificate, medals, outstanding athlete award certificate and so on.

Evaluation of Overall Residual Risk Acceptability (RRPN) 1020 process step compares the residual risk against given risk criteria to determine the acceptability of the risk. The RRPN criteria ranges are categorized as Intolerable (INT), As Far As Possible (AFAP), and Broadly Acceptable Region (BAR). The residual assigned disciplinary actions can be Expulsion, Suspension, Referrals, Disruptive Behavior, and Positive Behavior. After the implementation of corrective actions and preventive actions, students should move to lower discipline ranking. Eventually the student should be in the Positive Behavior category.

Risk Monitoring 1022 involves real time crime alerts monitoring, trending, reporting and continuing to identify and manage new risks.

Figure 11:
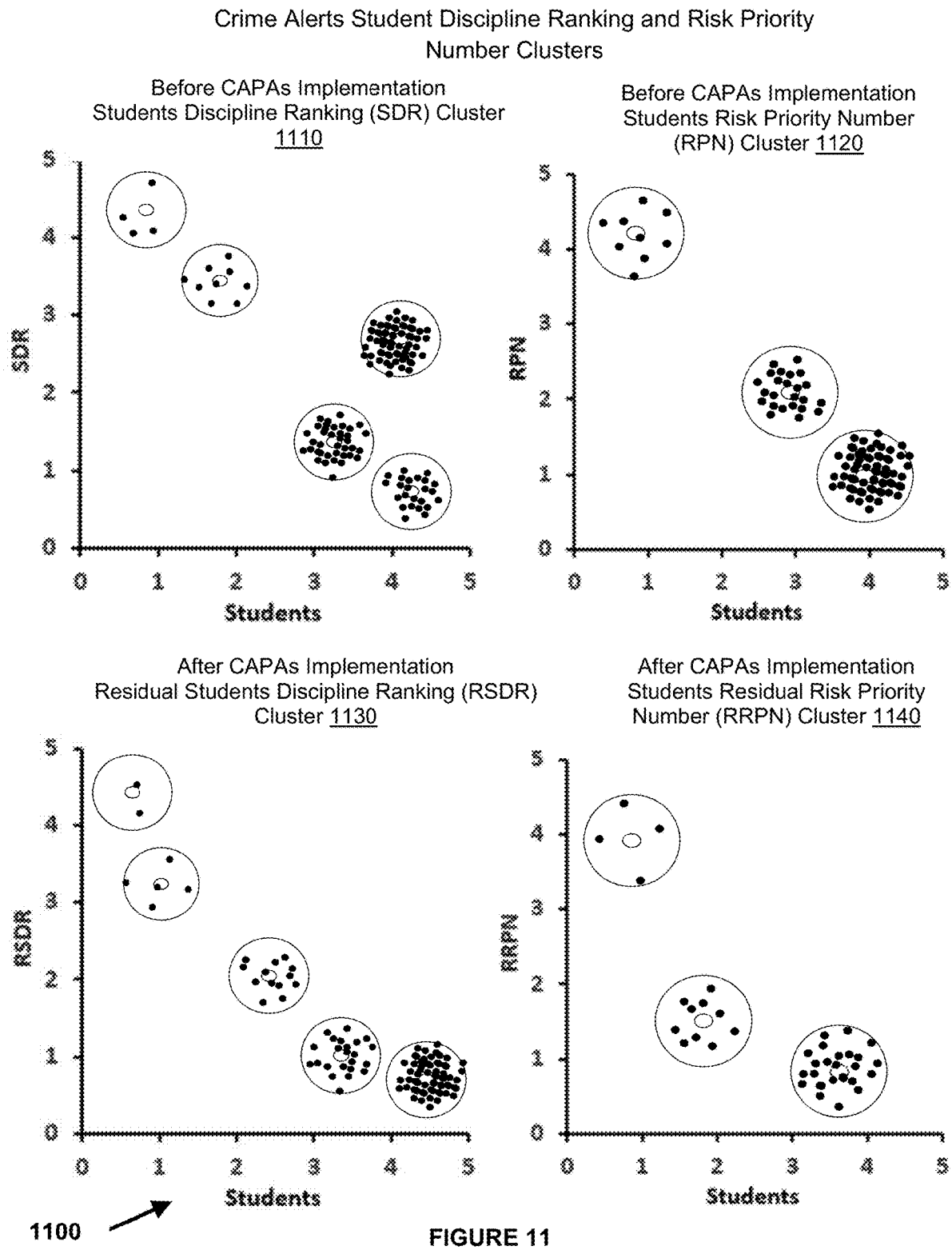
FIG. 11 illustrates an exemplary student discipline ranking and risk priority number clusters before and after corrective actions and preventive actions are implemented, according to some embodiments.

FIG. 11 illustrates exemplary Student Discipline Ranking and Risk Priority Number Clusters 1100 before and after corrective actions and preventive actions are implemented, according to some embodiments.

The clustering can be hierarchical, centroidal, distributional, or so on. In one of the scenarios, centroid k means algorithm can be used to assign the students to the nearest cluster's center. In the first level of clustering, it is to the nearest student's attributes level mean, and in the case of the second level, it is to the nearest SDR and RPN mean. For third level, it is to the nearest RSDR and RRPN mean.

The first level of clustering is based on students' attributes. It is created on a set of each attribute, which is divided into subsets from students so that observations within the same attribute clusters are similar and the input attribute data can be mined correctly. Probabilistic assumption is generated in place of missing attribute data based on the student and larger group data. The student attribute clusters are personal profile, performance, cognitive skills, behavior, genetic, physiological characteristics, family background, personal interest and instructional format, and so on. In addition, an overall student's attributes cluster is created.

The second level of clustering is based on Students Discipline Ranking (SDR) Cluster 1110 and Students Risk Priority Number (RPN) Cluster 1120. The student discipline ranking number is categorized from 1-5 as shown in Table 162. As an example, the students discipline ranking values are centered around the centroid mean for each of the 1-5 ranges. The RPN is categorized by numbers from 1-125 as shown in Table 154. In this case students RPN values are centered around the centroid mean for each of the INT, AFAP and BAR ranges.

The third level of clustering is based on Residual Students Discipline Ranking (RSDR) Cluster 1130 and Residual Students Risk Priority Number (RRPN) Cluster 1140. They are similar to Students Discipline Ranking (SDR) Cluster 1110 and Students Risk Priority Number (RPN) Cluster 1120 but are calculated after the student's corrective actions and preventive actions have been implemented and completed.

The initial and final state of disciplinary actions are DAi=DAf={Expulsion, Suspension, Referrals, Disruptive Behavior, Positive Behavior}. The goal is to decrease the final disciplinary "DAf" disciplinary action count substantially. The corrective actions and preventive actions implemented result in a significant reduction in school crime, and students move to the "Positive Behavior" category. The student positive behavior for example, can be attentive, alert, calm, cheerful, well-groomed, engaging, stays on task, consistent, goal-directed, inquisitive, accepts mistakes, willing to try again, asks for help, cooperative, takes initiative, agreeing, making balanced criticisms, approving, showing affection, protecting, praising, understanding and forgiving, and so on.

Figure 12:
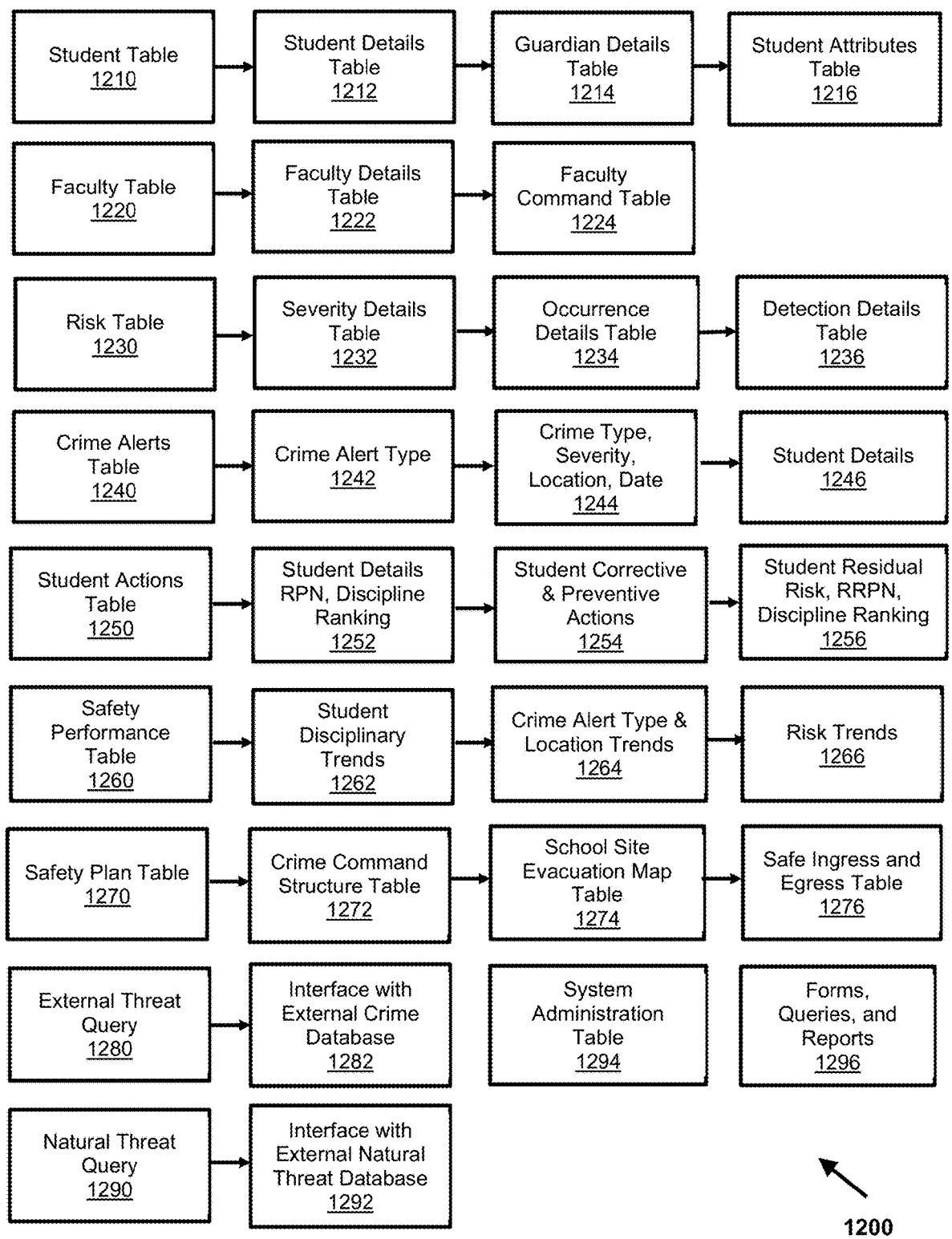
FIG. 12 illustrates an example block diagram of the Smart Campus Security Shield System Database Design, according to some embodiments.

FIG. 12 illustrates an example block diagram of the Smart Campus Security Shield Database Design 1200, according to some embodiments. Smart Campus Security Shield Database Design 1200 can be component of the Smart Campus Security Shield Software Architecture 600. The database consists of tables, forms, queries, and reports.

Student Table 1210 includes the Student Details Table 1212, Guardian Details Table 1214, and Student Attributes Table 1216. It stores the complete data associated with the student.

Faculty Table 1220 store the Faculty Details Table 1222 and the Faculty Command Table 1224.

Risk Table 1230 store the Severity Details Table 1232, the Probability of Occurrence Details Table 1234, and the Detection Details Table 1236. This severity also includes the potential root causes and associated corrective actions and preventive actions.

Crime Alerts Table 1240 stores records of Student Details 1242, Crime Alert Type, Severity, Location, Date 1244 and Details 1246. This includes the occurrence and detection rankings. The data is used to implement a student crime alert model which describes a crime alert severity, student ID number, name, location, date, time, and a set of details of the student;

Student Actions Table 1250 stores the Student Details RPN, Discipline Ranking 1252, the Associated Student Corrective Actions and Preventive Actions 1254, and the Overall Student Residual Risk, RRPN, Discipline Ranking 1156 information. The data is used to implement a student risk control model which generates a plurality of corrective actions and preventive actions for each individual student.

Safety Performance Table 1260 includes the statistical details of the Student Disciplinary Trends 1262, Crime Alert Types & Location Trends 1264, and Risk Trends 1266. This allows for continuous monitoring and measuring of the disciplinary data.

Safety Plan Tables 1270 has details about the Crime Command Structure Table 1272, School Site Evacuation Map Table 1274 and the Safety Ingress and Egress Table 1276. The information is available to School Security Staff 106 and Emergency Responders 108. The Faculty Command Structure is responsible for following the chain of command in the case of an emergency event.

External Threat Query 1280 interfaces with External Crime Database 1282 to display the neighborhood crime information. Similarly, the Natural Threat Query 1290 interfaces the External Natural Threat Database 1292. The communication is two way where through API the external crime software can query and populate their data with school crime data. The External Threat Query provides a neighborhood map with crime information. The real time Natural Threat Query shows hazards such as fires, earthquakes, snowstorms, flash flooding, winter storms, school bus accidents, and so on.

Finally, the System Administration Table 1294 stores information regarding the user and administration login and password and audit trail records. There are interactive Forms, Queries, and Reports 1296 which allow users to manually query, edit any data and generate safety performance reports.

Figure 13:
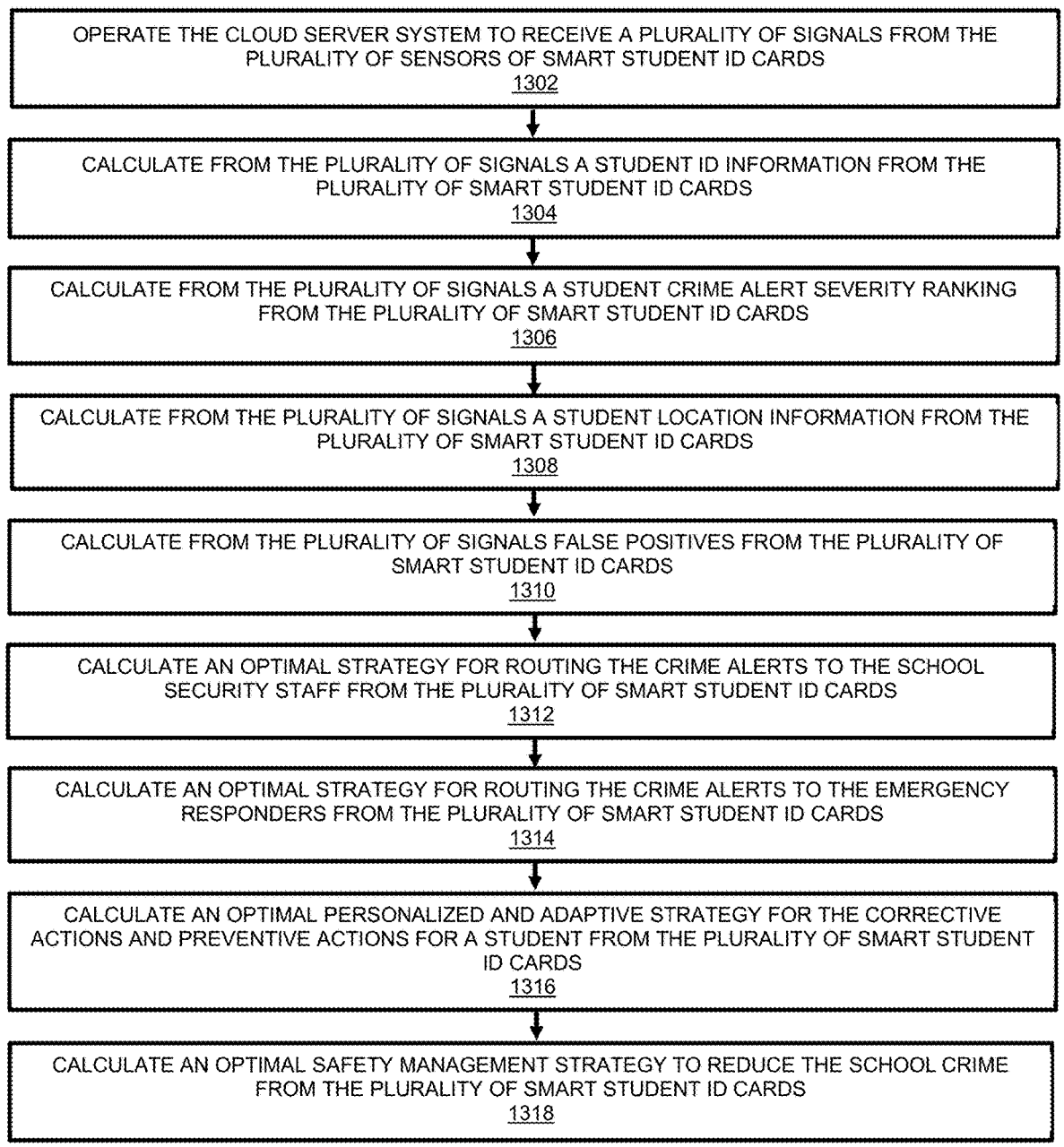
FIG. 13 is a block diagram of a sample computing environment that can be utilized to implement various embodiments.

FIG. 13 is a block diagram of a sample computing environment 1300 that can be utilized to implement various embodiments. The sample computing environment 1300 is part of Smart Campus Security Shield Software 110. It illustrates an example process for operating a Smart Campus Security Shield System 100 in which a plurality of several Smart Student ID Cards send alerts; a Smart Campus Security Shield Cloud Server 112 that receives signals through a wireless network by a set of sensors on the plurality of Smart Student ID Cards to sense the status of one or several of the cards, according to some embodiments.

In step 1302, computing environment 1300 can operate the Smart Campus Security Shield Cloud Server 112 system to receive a plurality of signals from the plurality of Smart Student ID Card.

In step 1304, computing environment 1300 can calculate from the plurality of signals a student ID information from the plurality of Smart Student ID Cards.

In step 1306, computing environment 1300 can calculate from the plurality of signals a student crime alert severity ranking from the plurality of Smart Student ID Cards.

In step 1308, computing environment 1300 can calculate from the plurality of signals a student location information from the plurality of Smart student ID Cards.

In step 1310, computing environment 1300 can calculate from the plurality of signals a false positives from the plurality of Smart student ID Cards.

In step 1312, computing environment 1300 can calculate an optimal strategy for routing, the crime alerts to the School Security Staff 106 from the plurality of Smart student ID Cards.

In step 1314, computing environment 1300 can calculate an optimal strategy for routing, the crime alerts to the Emergency Responders 108 from the plurality of Smart student ID cards.

In step 1316, computing environment 1300 can calculate from the plurality of signals an optimal personalized and adaptive strategy for the corrective actions and preventive actions for a student from the plurality of Smart Student ID Cards.

In step 1318, computing environment 1300 can calculate from the plurality of signals an optimal safety strategy to reduce the school crime from the plurality of Smart Student ID Cards. This allows the School Security Staff 106 to put appropriate controls in place. In addition to CAPAs this can be in the form of video surveillance cameras, armed guards, facility access controls and so on at the location with highest crime alerts.

FIG. 14 illustrates an example severity and occurrence ranking, definition and description, according to some embodiments. The crime alerts student risk control model in the Smart Campus Security Shield Cloud Server 112 memory comprises of risk severity ranking and probability of occurrence.

Table 142—Severity Ranking, Definition and Failure Effects Description contains detail information about crime alert severity ranking. The table describes potential failure effects associated with severity of harm.

The crime alert severity ranking is classified as Catastrophic=5, Critical=4, Serious=3, Minor=2, and Negligible=1. The crime alert type is mapped to crime alert severity ranking. For example, crime alert type severity number is set to active shooter=5, physical fight=4, and bullying=3. The table lists some of the crime alert type examples. Schools can customize the mapping between crime alert type and severity ranking.

Table 144—Probability of Occurrence Ranking, Definition and Description contains detail information about probability of occurrence ranking. The crime alert probability of occurrence ranking is classified as: Frequent=5, Probable=4, Occasional=3, Remote=2, and Improbable=1. The crime alert occurrence ranking provides information about number of time a given crime alert type is committed by a student.

FIG. 15 illustrates an example detection and risk priority ranking, definition and description, according to some embodiments.

Table 152—Detection Ranking, Definition and Description contains detail information about detection ranking. The crime alert detection ranking is classified as: Remote=5, Low=4, Moderate=3, High=2, and Very High=1. The detection ranking provides information about how easy or difficult to detect the student behavioral issues. This information can be mined through teacher's feedback on a student participation in the class, personal interest attributes, security camera, parent reports and so on.

Table 154—Risk Priority Number (RPN), Hazard Risk and Description Risk Priority Number is classified as: Intolerable (INT)=45-125, As Low As Possible (ALAP)=16-44, Broadly Acceptable Region (BAR)=1-15. The RPN cluster neural network model is used to take appropriate student disciplinary actions like expulsion, suspension, or referrals to reduce school violence. In ideal scenario after appropriate corrective actions and preventive actions are implemented there should be no disciplinary action required for the student.

FIG. 16 illustrates an example student discipline ranking, definition and description, according to some embodiments. The student discipline ranking is classified as: Expulsion=5, Suspension=4, Referrals=3, Disruptive Behavior=2, and Positive Behavior=1.

FIG. 17 illustrates an exemplary corrective actions and preventive actions assigned by the personalized machine learning method, according to some embodiments.

Table 172—Exemplary corrective actions and preventive actions are assigned based on the personalized machine learning method. The student crime alert type is mapped to safety problem or harm to school student or staff based on the severity ranking. There is an auto assignment of the root cause based on the crime alert type and safety problem. The root cause can be further refined and updated and updated by the School Security Staff 106. The corrective actions and preventive actions are auto assigned by the Personalized Machine Learning Method 910. The table lists three exemplary crime alert types namely active shooter, physical fight and bullying and corresponding safety problems, root cause of the problem and associated corrective actions and preventive actions. The crime alert type column also contains information about the severity, occurrence, detection, RPN, and SDR rankings before the corrective actions and preventive actions are refined, updated and implemented. As an example, for crime alert type, physical fight initial preventive action is "Monitor aggressive student behavior and channel it towards activities like sports" and bullying preventive action is "Set positive expectations about the behavior of student" are further refined and updated based on the Adaptive Machine Learning Method 920 in Table 182.

FIG. 18 illustrates Table 182 exemplary preventive actions refined and updated by the Adaptive Machine Learning Method 920, according to some embodiments.

The initial preventive action for crime alert type physical fight "Monitor aggressive student behavior and channel it towards activities like sports" is refined and updated into three preventive actions using Bayesian Predictive Learning Model 924 based on student interest in game of soccer. The Structured Prediction Learning Model 926 further refines these preventive actions based on student instructional format. These refinements are very important because they are based on individual student's preferences otherwise they corrective actions and preventive actions implementation will not be effective. The Reinforcement Learning Model 928 rewards the student in the form of participation certificate, medals and outstanding athlete award. The reinforcement learning model column also contains exemplary information about the residual severity, occurrence, detection, RRPN, and RSDR rankings after the corrective actions and preventive actions are refined, updated and implemented. This results in positive behavior by the student and reduction in school crime and violence.

Similarly, initial preventive action for crime alert type bullying "Set positive expectations about the behavior of student" is updated into three preventive actions using Bayesian Predictive Learning Model 924 based on student interest in the science projects. The Structured Prediction Model 926 refines these preventive actions based on student interest in physical science projects and instructional format. The physical science projects can be in the area of chemistry, environmental sciences, physics, electrical and so on based on student interest. The Reinforcement Learning Model 926 column also contains information about the residual severity, occurrence, detection, RRPN, and RSDR rankings after the corrective actions and preventive actions are refined, updated and implemented. Again, in this example also, the Reinforcement Learning Model 928 rewards the student in the form of participation certificate, medals and outstanding science student award. This results in positive behavior by the student and reduction in school crime and violence.

CONCLUSION

A Smart Campus Security Shield System comprising a Smart Student ID Card, wherein the card comprises a set of sensors inside the Smart Student ID Card. The set of sensors send a crime alert through a wireless network to a cloud server. The cloud server memory comprises a student crime alert model which describes the crime alert severity, student ID number, name, location, date, time, and a set of details of the student, so that the student risk control model can generate a plurality of corrective actions and preventive actions for each individual student. The crime alerts personalized and adaptive machine learning method presents a set of customized corrective actions and preventive actions to a student, based on at least one student attribute data. A set of student safety performance statistics is used to generate an optimal safety management strategy for the school security staff to reduce school crime.

Although the present embodiments have been described in reference to specific example embodiments, different modifications can be made to these without changing or taking away from the broader objective of the design. For example, additional sensors, devices, modules, or alterations in the software can be operated to improve the system.

The smart ID card can be of generic type with different number of buttons, icons and labels which can be programmed based on the environment where it is used. They can be used in educational, company, institutional, government, industrial, hospitals, storage, hazardous, residential buildings and so on.

In certain scenarios, a smart ID card might not be needed. The smart ID card functionality is a smart ID card app which can be installed into the mobile devices like phones, notepads, laptop and so on.

The goal of the Smart Campus Security Shield System is to target the right risk controls to the right students at the right time to reduce school crime.

In addition, it can be appreciated that the various operations, processes, and methods disclosed herein can be embodied in a machine readable medium and/or a machine accessible medium compatible with a data processing system and can be performed in any order. Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A Smart Campus Security Shield System comprising:
    a Smart Student ID Card, wherein the card comprises a set of sensors inside the Smart Student ID Card;
    the set of sensors sending a crime alert through a wireless network to a cloud server;
    wherein the cloud server memory comprises:
        a student crime alert model, wherein the student crime alert model describes a crime alert severity, a student ID number, a name, a location, a date, a time, and a set of details of a student;
        a student risk control model, wherein the student risk control model generates a set of student corrective actions and preventive actions;
        a machine learning model that implements a crime alert personalized and adaptive machine learning method, wherein the crime alert personalized and adaptive machine method presents the set student of corrective actions and preventive actions based on at least one student attribute data; and
        a set of student safety performance statistics, wherein the set of student safety performance statistics is used to generate an optimal safety management strategy for a school security staff to reduce school crime, wherein the set of sensors inside the Smart Student ID Card comprises:
            an RFID tag consisting of the student ID number, the name, and the set of details of the student;
            a location sensor to determine the student location;
            a cellular sensor to connect to a nearest cellular network;
            a WI-FI sensor to connect with any existing network;
            a set of three panic buttons to send a set of real time crime alert severities, the student ID numbers, the name, the locations, the date, and the time; and
        wherein the set of sensors send type-specific data to the cloud server.

2. The Smart Campus Security Shield System of claim 1, wherein the Smart Student ID Card comprises:
    a front side where a student information is printed;
    a back side with the set of three panic buttons; a microcomputer programmed with the student information;
    wherein the set of three panic buttons are programmed with a severity number;
    wherein any color is printed on top of the set of three panic buttons; and
    wherein any icon and text is printed on the either side of the set of three panic buttons.

3. The Smart Campus Security Shield System of claim 2, wherein a Smart Campus Security Shield Software landing page includes a map in which a set of real-time crime alert icons and locations are displayed; and
    wherein a software user interface allows for an access to a set of student crime alerts, the set of student corrective actions and preventive actions, a safety performance, an emergency responders' information, a safety plan, an external threat and natural threat information, and a system administration functionality.

4. The Smart Campus Security Shield System of claim 3, wherein the RFID tag comprises the student ID number, the name, and the set of details of the student.

5. The Smart Campus Security Shield System of claim 4, wherein the location sensor sends a geo-spatial position of the student to the cloud server.

6. The Smart Campus Security Shield System of claim 5, wherein the set of three panic buttons crime alert type severity number is set to an active shooter =5, a physical fight =4, and a bullying =3.

7. The Smart Campus Security Shield System of claim 6, wherein when a Smart Student ID Card panic button is pressed, the Smart Student ID Card panic button sends the crime alert severity, the student ID number, the name, the location, the date, and the time to the Cloud Server.

8. The Smart Campus Security Shield System of claim 7, wherein the crime alert severity, the student ID number, the name, the location, the date, and the time is automatically routed to a set of emergency responders in case of a crime alert type is the active shooter.

9. The Smart Campus Security Shield System of claim 8, a set of crime alerts student risk control model comprises:
    a crime alert risk severity ranking, classified as: a Catastrophic =5, a Critical =4, a Serious =3, a Minor =2, and a Negligible =1;
    a crime alert probability of occurrence ranking, classified as: a Frequent =5, a Probable =4, an Occasional =3, a Remote =2, and an Improbable =1;
    a crime alert detection ranking, classified as: a Remote =5, a Low =4, a Moderate =3, a High =2, and a Very High =1;
    a Risk Priority Number and Residual Risk Priority Number, classified as: an Intolerable (INT) =45-125, an As Low As Possible (ALAP) =16-44, and a Broadly Acceptable Region (BAR) =1-15; and
    a student discipline ranking, classified as: an Expulsion =5, a Suspension =4, a Referrals =3, a Disruptive Behavior =2, and a Positive Behavior =1.

10. The Smart Campus Security Shield System of claim 9, where the crime alert personalized and adaptive machine learning method comprises:
    a personalized machine learning method comprising the set of student corrective actions and preventive actions based on a set of attributes of the student;
    an adaptive machine learning method comprising a set of student customized corrective actions and preventive actions based on a personal interest of the student and a set of instructional format attributes.

11. The Smart Campus Security Shield System of claim 10, further comprises a method of operating a smart campus security system in which a plurality of Smart Student ID Cards send the crime alert severity, the student ID number, the name, the location, the date, and the time; the cloud server that receives signals through the wireless network by the set of sensors on the plurality of Smart Student ID Card to send the status of one or several of the Smart Student ID Cards, wherein the method includes:
- operating the cloud server system to receive a plurality of signals from the plurality of sensors of Smart Student ID Cards;
- calculating from the plurality of signals a student ID information from the plurality of Smart Student ID Cards;
- calculating from the plurality of signals a student crime alert severity ranking from the plurality of Smart Student ID Cards;
- calculating from the plurality of signals a student location information from the plurality of Smart Student ID Cards;
- calculating from the plurality of signals false positives from the plurality of Smart Student ID Cards;
- calculating an optimal strategy for routing the crime alerts to the school security staff from the plurality of Smart Student ID Cards;
- calculating an optimal strategy for routing the crime alerts to the emergency responders from the plurality of Smart Student ID Cards;
- calculating an optimal personalized and adaptive strategy for the student corrective actions and preventive actions for a student from the plurality of Smart Student ID Cards;
- calculating an optimal safety management strategy to reduce the school crime from the plurality of Smart Student ID Cards.

12. The Smart Campus Security Shield System of claim 11, wherein the Smart Student ID Card is programmed to work within a pre-determined area.

13. The Smart Campus Security Shield System of claim 12, wherein the Smart Student ID Card is used to record the student school entry and exit date and time.

14. The Smart Campus Security Shield System of claim 13, wherein the Smart Student ID Card is used to record the student school attendance.

15. The Smart Campus Security Shield System of claim 14, wherein the Smart Student ID Card is used as a school facility access card to enable access to a set of buildings, a set of controlled areas, a library and a set of computer systems.

16. The Smart Campus Security Shield System of claim 15, wherein the Smart Student ID Card is used for a pre-programmed meal plan.

17. The Smart Campus Security Shield System of claim 16, wherein the Smart Student ID Card is used for a library book check out.

18. The Smart Campus Security Shield System of claim 17, wherein the Smart Student ID Card information is remotely erased, deactivated or reprogrammed.

19. The Smart Campus Security Shield System of claim 18,
- wherein the Smart Student ID Card is programmed to work as a Smart ID Card;
- wherein the Smart ID Card is a physical card;
- wherein the Smart ID Card is a mobile app;
- wherein the Smart ID Card is programmed to provide an access to a facility building;
- wherein the Software user interface is customized to a facility building type;
- wherein the Smart ID Card set of three panic buttons are programmed to a set of customized crime alert types;
- wherein the Smart ID Card set of three panic buttons are printed with a set of customized icons and texts; and
- wherein when a Smart ID Card panic button is pressed, the Smart ID Card panic button sends the crime alert severity, an ID card number, the name, the location, the date, and the time to a facility security staff.

* * * * *